(12) United States Patent
Kunal et al.

(10) Patent No.: US 8,306,922 B1
(45) Date of Patent: *Nov. 6, 2012

(54) DETECTING CONTENT ON A SOCIAL NETWORK USING LINKS

(75) Inventors: Ranveer Kunal, Dist-Tirunelveli (IN); Kiran S. Panesar, Bangalore (IN); Madhukar N. Thakur, San Jose, CA (US)

(73) Assignee: Google Inc., Mountain View, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/571,924

(22) Filed: Oct. 1, 2009

(51) Int. Cl.
G06Q 99/00 (2006.01)
(52) U.S. Cl. ...................................................... 705/319
(58) Field of Classification Search .................. None
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,918,014 A | 6/1999 | Robinson |
| 5,948,061 A | 9/1999 | Merriman |
| 5,991,429 A | 11/1999 | Coffin et al. |
| 6,009,422 A | 12/1999 | Ciccarelli |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,256,648 B1 | 7/2001 | Hill et al. |
| 6,269,361 B1 | 7/2001 | Davis et al. |
| 6,356,659 B1 | 3/2002 | Wiskott et al. |
| 6,389,372 B1 | 5/2002 | Glance et al. |
| 6,401,075 B1 | 6/2002 | Mason et al. |
| 6,549,896 B1 | 4/2003 | Candan et al. |
| 6,594,673 B1 | 7/2003 | Smith et al. |
| 6,721,733 B2 | 4/2004 | Lipson et al. |
| 6,792,419 B1 | 9/2004 | Raghavan |
| 6,816,836 B2 | 11/2004 | Basu et al. |
| 6,985,882 B1 | 1/2006 | Del Sesto |

(Continued)

FOREIGN PATENT DOCUMENTS

EP 1 544 729 6/2005

(Continued)

OTHER PUBLICATIONS

U.S. Appl. No. 95/001,061, Stone.

(Continued)

*Primary Examiner* — Jonathan Ouellette
(74) *Attorney, Agent, or Firm* — Fish & Richardson P.C.

(57) ABSTRACT

In one implementation, a computer-implemented method includes receiving at information related to users of a social network site, and determining a social network graph for at least a portion of the social network, the graph including a plurality of nodes connected by links, each node corresponding to a user that has a profile page on the social network. The method can also include identifying first nodes from the plurality of nodes as including content associated with a particular subject of interest, and seeding the identified first nodes with first scores. The method can additionally include determining second scores for second nodes based on propagation of the first scores from the first nodes to the second nodes using the links of the social network graph; and providing the determined second scores for the second nodes.

20 Claims, 8 Drawing Sheets

U.S. PATENT DOCUMENTS

| | | | |
|---|---|---|---|
| 7,035,467 | B2 | 4/2006 | Nicponski |
| 7,039,599 | B2 | 5/2006 | Merriman |
| 7,136,875 | B2 | 11/2006 | Anderson et al. |
| 7,324,670 | B2 | 1/2008 | Kozakaya et al. |
| 7,492,943 | B2 | 2/2009 | Li et al. |
| 7,689,682 | B1 | 3/2010 | Eldering et al. |
| 7,701,608 | B2 | 4/2010 | Katayama et al. |
| 7,765,218 | B2 | 7/2010 | Bates et al. |
| 7,801,956 | B1 | 9/2010 | Cumberbatch et al. |
| 7,809,163 | B2 | 10/2010 | Sheu |
| 7,853,622 | B1 | 12/2010 | Baluja et al. |
| 7,904,461 | B2 | 3/2011 | Baluja et al. |
| 7,961,986 | B1 | 6/2011 | Jing et al. |
| 8,041,082 | B1 | 10/2011 | Baluja et al. |
| 8,055,664 | B2 | 11/2011 | Baluja et al. |
| 8,145,679 | B1 | 3/2012 | Baluja et al. |
| 2002/0023230 | A1 | 2/2002 | Bolnick et al. |
| 2002/0116466 | A1 | 8/2002 | Trevithick et al. |
| 2002/0120506 | A1 | 8/2002 | Hagen |
| 2002/0124053 | A1 | 9/2002 | Adams et al. |
| 2003/0050977 | A1 | 3/2003 | Puthenkulam et al. |
| 2004/0042599 | A1 | 3/2004 | Zaner et al. |
| 2004/0088325 | A1 | 5/2004 | Elder et al. |
| 2004/0122803 | A1 | 6/2004 | Dom et al. |
| 2004/0143841 | A1 | 7/2004 | Wang et al. |
| 2004/0148275 | A1 | 7/2004 | Achlioptas |
| 2004/0202349 | A1 | 10/2004 | Erol et al. |
| 2004/0215793 | A1 | 10/2004 | Ryan et al. |
| 2004/0267604 | A1 | 12/2004 | Gross |
| 2005/0043897 | A1 | 2/2005 | Meyer |
| 2005/0091202 | A1 | 4/2005 | Thomas |
| 2005/0114325 | A1 | 5/2005 | Liu et al. |
| 2005/0125308 | A1 | 6/2005 | Puentes et al. |
| 2005/0125408 | A1 | 6/2005 | Somaroo et al. |
| 2005/0144069 | A1 | 6/2005 | Wiseman et al. |
| 2005/0149395 | A1 | 7/2005 | Henkin et al. |
| 2005/0154639 | A1 | 7/2005 | Zetmeir |
| 2005/0159998 | A1 | 7/2005 | Buyukkokten et al. |
| 2005/0171832 | A1 | 8/2005 | Hull et al. |
| 2005/0198031 | A1 | 9/2005 | Pezaris et al. |
| 2005/0216300 | A1 | 9/2005 | Appelman et al. |
| 2005/0278443 | A1 | 12/2005 | Winner et al. |
| 2006/0004704 | A1 | 1/2006 | Gross |
| 2006/0031121 | A1 | 2/2006 | Speicher |
| 2006/0069584 | A1 | 3/2006 | Bates et al. |
| 2006/0085259 | A1 | 4/2006 | Nicholas et al. |
| 2006/0136098 | A1 | 6/2006 | Chitrapura et al. |
| 2006/0165040 | A1 | 7/2006 | Rathod et al. |
| 2006/0184617 | A1 | 8/2006 | Nicholas et al. |
| 2006/0190225 | A1 | 8/2006 | Grand |
| 2006/0200435 | A1 | 9/2006 | Flinn et al. |
| 2006/0204142 | A1 | 9/2006 | West et al. |
| 2006/0218577 | A1 | 9/2006 | Goodman et al. |
| 2006/0247940 | A1 | 11/2006 | Zhu et al. |
| 2006/0248573 | A1 | 11/2006 | Pannu et al. |
| 2006/0271460 | A1 | 11/2006 | Hanif |
| 2006/0282328 | A1 | 12/2006 | Gerace et al. |
| 2006/0294084 | A1 | 12/2006 | Patel et al. |
| 2006/0294134 | A1 | 12/2006 | Berkhim et al. |
| 2007/0005341 | A1 | 1/2007 | Burges et al. |
| 2007/0043688 | A1 | 2/2007 | Kountz et al. |
| 2007/0043766 | A1 | 2/2007 | Nicholas et al. |
| 2007/0050406 | A1 | 3/2007 | Moore |
| 2007/0106551 | A1 | 5/2007 | McGucken |
| 2007/0121843 | A1 | 5/2007 | Atazky et al. |
| 2007/0124721 | A1 | 5/2007 | Cowing et al. |
| 2007/0192306 | A1 | 8/2007 | Papakonstantinou et al. |
| 2007/0203940 | A1 | 8/2007 | Wang et al. |
| 2007/0218900 | A1 | 9/2007 | Abhyanker |
| 2007/0288462 | A1 | 12/2007 | Fischer et al. |
| 2008/0010275 | A1 | 1/2008 | Lee et al. |
| 2008/0091834 | A1 | 4/2008 | Norton |
| 2008/0103784 | A1 | 5/2008 | Wong et al. |
| 2008/0103877 | A1 | 5/2008 | Gerken |
| 2008/0104079 | A1 | 5/2008 | Craig |
| 2008/0104225 | A1 | 5/2008 | Zhang et al. |
| 2008/0120308 | A1 | 5/2008 | Martinez et al. |
| 2008/0120411 | A1 | 5/2008 | Eberle |
| 2008/0126476 | A1 | 5/2008 | Nicholas et al. |
| 2008/0140650 | A1 | 6/2008 | Stackpole |
| 2008/0155080 | A1 | 6/2008 | Marlow et al. |
| 2008/0159590 | A1 | 7/2008 | Yi et al. |
| 2008/0162431 | A1 | 7/2008 | Xu et al. |
| 2008/0189169 | A1 | 8/2008 | Turpin et al. |
| 2008/0195657 | A1 | 8/2008 | Naaman et al. |
| 2008/0215416 | A1 | 9/2008 | Ismalon |
| 2008/0243607 | A1 | 10/2008 | Rohan et al. |
| 2008/0249966 | A1 | 10/2008 | Luege Mateos |
| 2008/0275861 | A1* | 11/2008 | Baluja et al. ............... 707/5 |
| 2008/0275899 | A1 | 11/2008 | Baluja et al. |
| 2009/0024548 | A1 | 1/2009 | Zhu et al. |
| 2009/0063284 | A1 | 3/2009 | Turpin et al. |
| 2009/0076800 | A1 | 3/2009 | Li et al. |
| 2009/0112701 | A1 | 4/2009 | Turpin et al. |
| 2009/0192967 | A1 | 7/2009 | Luo et al. |
| 2009/0248661 | A1 | 10/2009 | Bilenko et al. |
| 2009/0319288 | A1* | 12/2009 | Slaney et al. ............... 705/1 |
| 2011/0112916 | A1 | 5/2011 | Baluja et al. |
| 2011/0268369 | A1 | 11/2011 | Richards et al. |
| 2012/0054205 | A1 | 3/2012 | Baluja et al. |

FOREIGN PATENT DOCUMENTS

| | | |
|---|---|---|
| JP | 11-265369 | 9/1999 |
| JP | 2002-132604 | 5/2002 |
| WO | WO97/21183 | 6/1997 |
| WO | WO00/68860 | 11/2000 |
| WO | WO2004/111771 | 12/2004 |
| WO | WO2006/121575 | 11/2006 |

OTHER PUBLICATIONS

U.S. Appl. No. 95/001,068, Stone.
U.S. Appl. No. 95/001,069, Stone.
U.S. Appl. No. 95/001,073, Stone.
U.S. Appl. No. 11/733,734, filed Apr. 2007, Baluja et al.
Accounts, at http://www.cs.rice.edu/~ssiver/accounts/, as available via the Internet and printed on Jul. 29, 2004.
Adamic et al., "A Social Network Caught in the Web," at http://firstmonday.org/issues/issue8_6/adamic/, as available via the Internet and printed on Jul. 28, 2004.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
AdStar.com website archive from www.Archive.org, Apr. 12, 1997, and Feb. 1, 1997.
Amazon.com, "Selling at Amazon Marketplace," at http://pages.amazon.com/exec/obidos/tg/browse/-/1161234/ref=hp_hp_is_4_2/002-283572 as available via the Internet and printed on Jul. 29, 2004.
Amazon.com, "New Seller FAQ," at http://pages.amazon.com/exec/obidos/tg/browse/-/1161274/002-2835726-5513622 as available via the Internet and printed on Jul. 29, 2004.
Azran, "The Rendezvous Algorithm: Multiclass Semi-Supervised Learning with Markov Random Walks," *ICML*, 2007, 8 pages.
Baluja and Rowley, *Intl J Computer Vision*, 2007, 71(1): at http://portal.acm.org/toc.cfm?id=J325&type=periodical&coll=&dl=ACM&CFID=15151515&CFTOKEN=6184618.
Baluja et al., "Video Suggestion and Discovery for YouTube: Taking Random Walks Through the View Graph," *Proc. 17th International World Wide Web Conference (WWW)*, 2008.
Baseview Products, Inc., AdManager Pro Administrator's Manual v. 2.0, Jun. 1998.
Baseview Products, Inc., ClassManagerPro Administration and Receivables Manual v. 1.0.5, Feb. 1, 1997.
Bay et al., "SURF: Speeded up robust features," *Proc. 9th International European Conference on Computer Vision (ECCV)*, pp. 404-417, 2006.
Belongie et al., "Shape matching and object recognition using shape contexts," *IEEE Transactions on Pattern Analysis and Machine Intelligence (TPAMI)*, vol. 24, No. 24, pp. 509-522, 2002.

Boccaletti et al., "Complex Networks: Structure and Dynamics," *Physics Reports*, 2006, 424:175-308.

Brin and Page, "The Anatomy of a Large-Scale Hypertextual Web Search Engine," *Computer Networks*, 1998, pp. 1-26.

Business Wire, "Global Network, Inc. Enters Into agreement in Principle with Major Advertising Agency," Oct. 4, 1999.

Carson et al., "Blobworld: Image Segmentation Using Expectation-Maximization and Its Application to Image Querying," *IEEE transactions on Pattern Analysis and Machine Intelligence (TPAMI)*, 2002, 24(8):1026-1038.

Chakrabarti et al., "Mining the Web's Link Structure," *IEEE Computer Magazine*, 1999, pp. 60-67.

Dalal and Triggs, "Histograms of Oriented Gradients for Human Detection," *Proc IEEE Conf Computer Vision and Pattern Recognition*, Jun. 2005, pp. 886-893.

Datar et al., "Locality-sensitive hashing scheme based on p-stable distributions," *Proc 20th Symposium on Computational Geometry (SCG)*, pp. 253-262, 2004.

Datta et al., "Image retrieval: Ideas, influences, and trends of the new age," *ACM Computing Surveys*, 2008, 40(2).

Dedrick, Interactive Electronic Advertising, IEEE, 1994, pp. 55-66.

Dedrick, A Consumption Model for Targeted Electronic Advertising, Intel Architecture Labs, IEEE, 1995, pp. 41-49.

Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf.

Doctorow, "Running Notes from Revenge of the User: Lessons from Creator/User Battles," at http://craphound.com/danahetcon04.txt, as available via the Internet and printed Jul. 28, 2004.

Ebay.com, "What is eBay?" at http://pages.ebay.com/help/welcome/questions/about-ebay.html as available via the Internet and printed on Jul. 29, 2004.

Ebay.com, "How to Bid," at http://pages.ebay.com/help/welcome/bid.html as available via the Internet and printed on Jul. 29, 2004.

Ebay.com, "How to Sell," at http://pages.ebay.com/help/welcome/sell.html as available via the Internet and printed on Jul. 29, 2004.

Facebook Press Release "Users Gain Ability to Share their Action from 44 Participating Sites with their Friends on Facebook" [online] [retrieved on Jan. 24, 2008] [retrieved from the internet: http://www.facebook.com/press/releases.php?p9166] 1 page.

Fergus et al., "A visual category filter for Google images," *Proc. 8th European Conference on Computer Vision (ECCV)*, 2004, pp. 242-256.

Fergus et al., "Object class recognition by unsupervised scale-invariant learning," *Proc. Conference on Computer Vision and Pattern Recognition (CVPR)*, 2003, 2:264-271.

Frey and Dueck, "Clustering by Passing Messages Between Data Points," *Science*, 2007, 315:972-976.

Friedman et al., "Bayesian network classifiers," *Machine Learning*, 1997, 29:131-163.

Frome et al., "Learning globally-consistent local distance functions for shape-based image retrieval and classification," *Proc. 11th IEEE International Conference on Computer Vision (ICCV)*, pp. 1-8, 2007.

Gibson et al., "Inferring Web Communities from Link Topology," *Proc 9th ACM Conference on Hypertex and Hypermedia*, 1998, 10 pages.

Gionis et al., "Similarity Search in High Dimensions via Hashing," *Proc 25th Very Large Database Conf*, 1999 at people.csail.mit.edu/indyk/vldb99.ps.

Glance et al., "Knowledge Pump: Supporting the Flow and Use of Knowledge," *Information Technology for Knowledge Management*, 1997, Borghoff and Pareschi (eds.), Springer Verlag, 22 pages.

Grauman and Darrell, "The Pyramid Match Kernel: Discriminative Classification with Sets of Image Features," *ICCV 2005* at http://people.csail.mit.edu/kgrauman/jobapp/krauman_sample_papers.pdf.

Harris and Stephens, "A combined corner and edge detector," *Proc. 4th Alvey Vision Conference*, pp. 147-151, 1988.

Haveliwala, "Topic-Sensitive PageRank," *IEEE Transactions on Knowledge and Data Engineering*, 2003, 10 pages.

He et al., "Imagerank: spectral techniques for structural analysis of image database," *Proc. International Conference on Multimedia and Expo*, 2002, 1:25-28.

Herlocker et al., "Evaluating Collaborative Filtering Recommender Systems," *ACM Transactions on Information Systems*, 2004, 22(1):5-53.

Hsu et al., "Video search reranking through random walk over document-level context graph," *Proc. 15th International Conference on Multimedia*, 2007 pp. 971-980.

Indyk and Motwani, "Approximate Nearest Neighbors: Towards Removing the Curse of Dimensionality," *Proc. 30th ACM Symp. On Computational Theory*, 1998, pp. 604-613.

Indyk, "Stable Distributions, Pseudorandom Generators, Embeddings, and Data Stream Computation," *Proc. 41st IEEE Symposium on Foundations of Computer Science (FOCS)*, pp. 189-197, 2000.

Information Access Technologies, Inc., Aaddzz brochure, "The best Way to Buy and Sell Web Advertising Space," 1997.

Information Access Technologies, Inc., Aaddzz.com website archive from www.Archive.org, archived on Jan. 30, 1998.

Jeh and Widom, "SimRank: A Measure of Structural-Context Similarity," *Proc 8th ACM SIGKDD international conference on knowledge discovery and data mining*, Jul. 2002, pp. 538-543.

Jing et al., "Canonical image selection from the web," *Proc. 6th International Conference on Image and Video Retrieval (CIVR)*, pp. 280-287, 2007.

Jing and Baluja, "VisualRank: Applying PageRank to Large-Scale Image Search," *IEEE Transaction on Pattern Analysis and Machine Intelligence*, 2008, 30(11):1877-1890.

Joachims, "Text Categorization with Support Vector Machines: Learning with Many Relevant Features," *Proc 10th European Conf on Machine Learning*, 1998, pp. 137-142.

Joshi et al., "The story picturing engine—a system for automatic text illustration," *ACM Transactions on Multimedia, Computing, Communications and Applications*, 2006, 2(1):68-89.

Kautz et al., "ReferralWeb: Combining Social Networks and Collaborative Filtering," *Communications of the ACM*, 1997, 40(3):1-4.

Ke et al., "Efficient near-duplicate detection and sub-image retrieval," *Proc. ACM International Conference on Multimedia (ACM MM)*, pp. 869-876, 2004.

Ke and Sukthankar, "PCA-SIFT: A More Distinctive Representation for Local Image Descriptors," *Proc. Conference on Computer Vision and Pattern Recognition (DVPR)*, 2004, 2:506-516.

Kleinberg et al., "The Web as a graph: measurements, models, and methods," *Proc International Conference on Combinatronics*, 1999, 18 pages.

Kleinberg, "Authoritative Sources in a Hyperlinked Environment," *Journal of the ACM*, 1999, 46(5):604-632.

Kondor and Lafferty, "Diffusion kernels on graphs and other discrete structures," *Proc. 19th International Conference on Machine Learning (ICML)*, pp. 315-322, 2002.

Konstan et al., "GroupLens: Applying Collaborative Filtering to Usenet News," *Communications of the ACM*, Mar. 1997, 40(3):77-87.

Lazebnik et al., "A sparse texture representation using affine-invariant regions," *Proc. Conference on Computer Vision and Pattern Recognition (CVPR)*, vol. 2, pp. 319-324, 2003.

Leigh et al., "Transformation, Ranking, and Clustering for Face Recognition Algorithm Comparison," at http://www.itl.nist.gov/div898/itperf/renorm.pdf.

Liew et al., "Social Networks," U.S. Appl. No. 60/552,718, filed Mar. 15, 2004, 9 pages.

Liu et al., "A Comparative Study on Feature selection and Classification methods Using Gene Expression Profiles and Proteomic Patterns," *Genome Informatics* 13:, pp. 51-60, 2002.

Liu et al., "An Investigation of Practical Approximate Nearest Neighbor Algorithms," *Proc Neural Information Processing Systems*, 2004 at http://www.cs.cmu.edu/~tingliu/research/htm.

Lowe, "Distinctive Image Features from Scale-Invariant Keypoints," *International Journal of Computer Vision (IJCV)*, 2004, 60(2):91-110.

Lowe, "Local Feature View Clustering for 3D Object Recognition," *CVPR 2001*, at http://www.cs.ubc.ca/~lowe/papers/cvpr01.pdf.

Ma and Manjunath, "NeTra: A Toolbox for Navigating Large Image Databases," *Multimedia System*, 1999, 3(7):184-198.

Microsoft Corporation, "Is Friendster the 'Next Big Thing'?" at http://mobilemomentum.msn.com/article.aspx?aid=4, as available via the Internet and printed on Jul. 29, 2004.

Mikolajczyk and Schmid, "A performance evaluation of local descriptors," *IEEE Transactions on Pattern Analysis and Machine Intelligence (TPAMI)*, 2005, 27(10):1615-1630.

Monay and Gatica-Perez, "On Image Auto-Annotation with Latent Space Models," *MM'03*, Nov. 2-8, 2003.

Multiply, "About Multiply," at http://multiply.com/info/about, as available via the Internet and printed on May 3, 2004.

Multiply, "Help," at http://multiply.com/info/help, as available via the Internet and printed on May 3, 2004.

Multiply, "Multiply Privacy Policy," at http://multiply.com/info/privacy, as available via the Internet and printed on May 3, 2004.

Multiply, "Multiply Terms of Service," at http://multiply.com/info/tos, as available via the Internet and printed on May 3, 2004.

Nistér and Stewénius, "Scalable recognition with a vocabulary tree," *Proc. Conference on Computer vision and Pattern Recognition (CVPR)*, vol. 2, pp. 2161-2168, 2006.

Nowak and Jurie, "Learning visual similarity measures for comparing never seen objects," *Proc. Conference on Computer Vision and Pattern Recognition (CVPR)*, 2007.

Park et al., "Majority based ranking approach in web image retrieval," *Lecture Notes in Computer Science*, vol. 27-28, pp. 499-504, 2003.

Pentland et al., "Photobook: Content-based manipulation of image databases," *International Journal of Computer Vision (IJCV)*, 1996, 18(3):233-254.

Philbin et al., "Object retrieval with large vocabularies and fast spatial matching," *Proc. Conference on Computer Vision and Pattern Recognition (CVPR)*, 2007.

Pilászy, "Text Categorization and Support Vector Machines," *Computer Science*, 1998, vol. 1398, 10 pages.

Press Releases Facebook "Leading Websites Offer Facebook Beacon for Social Distribution" [online] [retrieved from the Internet: http://www.facebook.com/press/releases.php?p9166] retrieved on Jan. 24, 2008, 1 page.

Roach et al., "Video Genre Classification Using Dynamics," 2001, *Proc Acoustics, Speech, and Signal Processing on IEEE Intl Conference*, pp. 1557-1560.

Rothganger et al., "3D Object Modeling and Recognition Using Affine-Invariant Patches and Multi-View Spatial Constraints," *CVPR 2003*, at http://vasc.ri.cmu.edu/~hebert/04AP/fred_cvpr03.pdf.

Rowley et al., "Neural Network-Based Face Detection," *IEEE Transactions on Pattern Analysis and Machine Intelligence*, 1998, 20(1).

Schindler et al., "City-Scale Location Recognition," *Proc. Conference on Computer Vision and Pattern Recognition (CVPR)*, 2007, 7 pages.

Sebastiani, "Machine Learning in Automated Text Categorization," *ACM Computing Surveys*, 2002, 34(1):1-47.

Simon et al., "Scene summarization for online image collections," *Proc. 12th International Conference on Computer Vision (ICCV)*, 2007.

Smeulders et al., "Content based image retrieval at the end of the early years," *IEEE Transactions on Pattern Analysis and Machine Intelligence (TPAMI)*, 2000, 22(12):1349-1380.

Sullivan, Danny, "Is It Really Personalized Search?" http://searchenginewatch.com printed on May 13, 2004.

Szummer and Jaakkola, "Partially labeled classification with Markov random walks," *NIPS* 2001.

Tribe.net, "Listings Directory," at http://www.tribe.net/tribe/servlet/template/pub.Listings.vm, as available via the Internet and printed on Jun. 28, 2004.

Uchihashi and Kanade, "Content-free image retrieval by combinations of keywords and user feedbacks," *Proc. 5th International Conference on Image and Video Retrieval (CIVR)*, pp. 650-659, 2005.

Viola and Jones, "Robust Real Time Face Detection," *Int J Computer Vision*, 2004 at http://scholar.google.com/scholar?hl=en&lr<&cluster=10098362814192689387.

Wang et al., "AnnoSearch: Image Auto-Annotation by Search," *CVPR* 2006.

Weinberger et al., "Distance metric learning for large margin nearest neighbor classification," *Proc. 18th Conference on Advances in Neural Information Processing Systems (NIPS)*, vol. 18, pp. 1437-1480, 2006.

Winder and Brown, "Learning local image descriptors," *Prof. Conference on Computer Vision and Pattern Recognition (CVPR)*, 2007.

Xing et al., "Distance metric learning, with applications to clustering with side-information," *Proc. 15th Conference on Advances in Neural Information Processing Systems (NIPS)*, 2002, 15:450-459.

Yang et al., "Mining Social Networks for Targeted Advertising," *Proceedings of the 39th Hawaii International Conference on System Sciences*, 2006.

Yang and Pedersen, "A Comparative Study on Feature Selection in Text Categorization Source," *Proc 14th Intl Conf Machine Learning*, 1997, pp. 412-420.

Zeff et al., *Advertising on the Internet*, 2nd ed., John Wiley & Sons, 1999.

Zhang. 'Facebook unveils school-specific advertisements' [online]. The Stanford Daily, 2005, [retrieved on Aug. 16, 2010]. Retrieved from the Internet: http://www.stanforddaily.com/2005/01/06/facebook-unveils-school-specific-advertisements/, (Jan. 6, 2005) 1 page.

Zhou and Schölkopf, "Learning from Labeled and Unlabeled Data Using Random Walks," *Lecture notes in computer science*, 2004, Springer, 8 pages.

Zhu et al., "Semi-Supervised Learning Using Gaussian Fields and Harmonic Functions," *Proc. 20th Intl Conf on Machine Learning*, 2003, 8 pages.

Zhu, "Semi-Supervised Learning with Graphs," 2005, Doctoral Thesis, Carnegie Mellon University, 174 pages.

International Search Report/Written Opinion in PCT/US2008/062263 mailed Jan. 1, 2008, 13 pages.

International Preliminary Report on Patentability in PCT/US2008/062263 mailed Nov. 12, 2009, 7 pages.

International Search Report/Written Opinion in PCT/US2008/62285 mailed Dec. 5, 2008, 12 pages.

International Preliminary Report on Patentability in PCT/US2008/62285 mailed Nov. 12, 2009, 8 pages.

\* cited by examiner

US 8,306,922 B1

DETECTING CONTENT ON A SOCIAL NETWORK USING LINKS

TECHNICAL FIELD

This document generally describes methods and systems for detecting content on a social network.

BACKGROUND

The present disclosure generally relates to providing detecting content contained on a social network of users. A social network can be an online system that provides a forum for users who are geographically separated from each other to interact with one another. Social networks can be aimed at different aspects of social interaction, such as friendship and business networking.

In general, a user of a social network has a profile page that is customizable by the user. A user can post content, such as text, images, and video, to its profile page. Detection of content that has been posted to profile pages on a social network (e.g., to identify inappropriate content) has included manual review of profile pages.

SUMMARY

This document describes techniques, methods, and systems for detecting content contained on a social network of users. In general, content pertaining to a particular subject of interest can be detected on a social network based upon links between users of a social network. A link among users of a social network can be any appropriate sort of connection between two or more users of a social network, such as an explicit acquaintance relationship (e.g., designation as friends, colleagues, fans, blog feed followers, etc.), an implicit acquaintance relationship (e.g., friends in common, messages sent between users, viewing another user's profile page, etc.), a common group membership (e.g., membership in a group related to a particular interest, membership in a group related to a particular geographic area, etc.), participation in a common activity (e.g., users posting messages to the same forum, users playing an online game together, etc.), etc.

Users that share a link on a social network may share similar interests and may post content related to similar subjects on their profile pages. Using information regarding content on a social network that has already been identified as pertaining to a particular subject of interest and links between users, the described techniques, methods, and systems can detect content on the social network that likely also pertains to the particular subject of interest.

In one implementation, a computer-implemented method includes receiving at a first server system information related to users of a social network site hosted on a second server system, and determining by the first server system a social network graph for at least a portion of the social network from the received information, the graph including a plurality of nodes connected by links, each node corresponding to a user that is registered with the social network and that has a profile page on the social network. The method can also include identifying first nodes from the plurality of nodes as including content associated with a particular subject of interest, and seeding the identified first nodes with first scores that indicate profile pages for the identified first nodes are positively identified as including content associated with the particular subject of interest. The method can additionally include determining second scores for second nodes of the plurality of nodes based on propagation of the first scores from the first nodes to the second nodes using the links of the social network graph, where each of the determined second scores corresponding to a second node indicates a likelihood that a profile page for the second node contains content associated with the particular subject of interest; and providing by the first server system the determined second scores for the second nodes.

In another implementation, a system for detecting profile pages on a social network as including content associated with a particular subject of interest includes one or more servers and an interface for the one or more servers that is configured to receive information related to users of a social network site hosted on a second server system. The system can also include a social graph linking module configured to determine a social network graph for at least a portion of the social network from the information received by the interface, the graph including a plurality of nodes connected by links, each node corresponding to a user that is registered with the social network and that has a profile page on the social network. The system can additionally include a score seeding component that identifies first nodes from the plurality of nodes as including content associated with a particular subject of interest and that seeds the identified first nodes with first scores that indicate profile pages for the identified first nodes are positively identified as including content associated with the particular subject of interest. The system can further include an iterative score propagation module that is configured to determine second scores for second nodes of the plurality of nodes based on propagation of the first scores from the first nodes to the second nodes using the links of the social network graph, where each of the determined second scores corresponding to a second node indicates a likelihood that a profile page for the second node contains content associated with the particular subject of interest. The system can also include a profile content detection module configured to provide the determined second scores for the second nodes.

In another implementation, a system for detecting profile pages on a social network as including content associated with a particular subject of interest includes one or more servers and an interface for the one or more servers that is configured to receive information related to users of a social network site hosted on a second server system. The system can also include a social graph linking module configured to determine a social network graph for at least a portion of the social network from the information received by the interface, the graph including a plurality of nodes connected by links, each node corresponding to a user that is registered with the social network and that has a profile page on the social network. The system can further include a score seeding component that identifies first nodes from the plurality of nodes as including content associated with a particular subject of interest and that seeds the identified first nodes with first scores that indicate profile pages for the identified first nodes are positively identified as including content associated with the particular subject of interest. The system can additionally include means for detecting profile pages on a social network as including content associated with a particular subject of interest that is configured to determine second scores for second nodes of the plurality of nodes based on propagation of the first scores from the first nodes to the second nodes using the links of the social network graph, where each of the determined second scores corresponding to a second node indicates a likelihood that a profile page for the second node contains content associated with the particular subject of interest. The system can also include a profile content detection module configured to provide the determined second scores for the second nodes.

Particular embodiments can be implemented to realize one or more of the following advantages. Content can be detected on a social network with greater efficiency. Instead of relying upon manual review of the pages of a social network, pages that likely contain content can be quickly located based upon links between users of the social network. A greater amount of content can be located on a social network in less time than under traditional manual review. Additionally, detection of content on the social network using links between users permits for a high degree of accuracy. Furthermore, detecting content based on links between users of a social network can have greater accuracy and efficiency than other automated techniques, such as content-based detection techniques.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
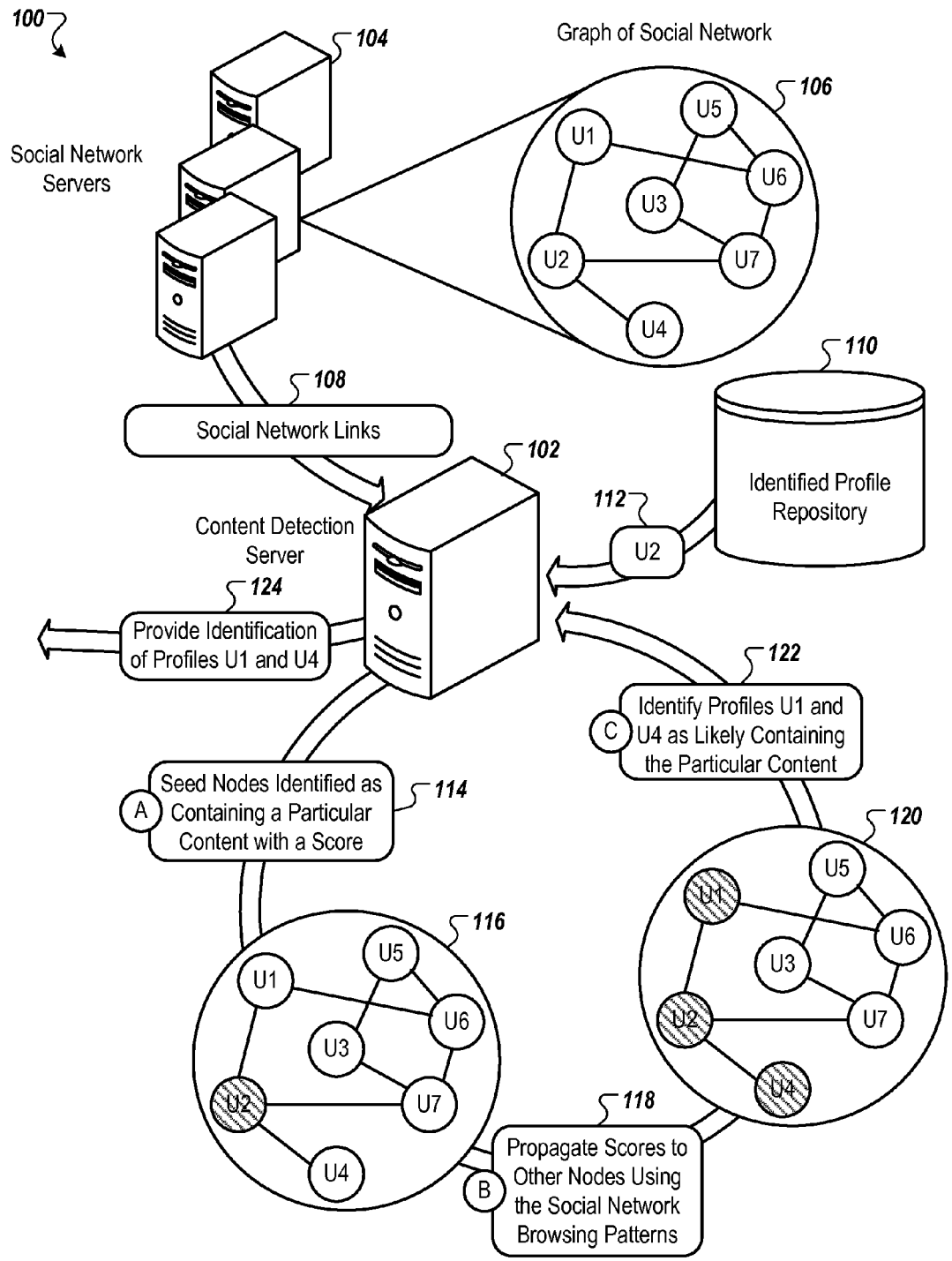
FIG. 1A is a conceptual diagram of an example system for detecting content on a social network using links among users of the social network.

This document describes techniques, methods, and systems for detecting content contained on a social network of users. Social networks (e.g., FACEBOOK, MYSPACE, ORKUT, TWITTER, LINKEDIN, YOUTUBE, etc.) provide an electronic environment within which users can interact with one another. Users of a social network generally have at least one corresponding profile page. A user of a social network can customize his/her profile page on the social network. User customization of a profile page can include posting images, text, videos, graphics, games, interactive applications, etc. Depending on the social network, user profile pages and the customized content contained therein can be viewed by other users and/or the general public. Generally, users are able to add content to the profile pages for other users to see without the content having to first be accurately classified (e.g., tagged) as pertaining to a particular subject and/or approved by the social network. While this is desirable for users of a social network, it can be problematic for social networks.

For example, a social network may desire to provide advertising that is related to the content on a user's profile page. However, without a designation (e.g., content tag, content classification, etc.) associated with customized content added by users, the social network may not be able to accurately provide such content-related advertising. In another example, users of a social network may post content that is illegal (e.g., content violating copyright law, content violating penal statutes, etc.), inappropriate for minors (e.g., pornography, "R" or "NC-17" rated videos, adult content, etc.), in contravention of an end user licensing agreement (EULA), etc. Attempts by a social network to remove and/or filter content that is illegal, age inappropriate, in violation of EULA, etc. can be stifled by a lack of accurate classifications for user-added content.

Social networks can attempt to detect the potentially problematic content through content analysis. However, detecting content pertaining to a particular subject of interest (e.g., advertisement-related content, illegal content, content that is inappropriate for minors, content in violation of EULA, etc.) on a social network by analyzing the content itself can be a difficult task given the large amount of ever-changing user-posted content that is contained on a social network. Additionally, detecting content through content analysis can be complicated by the large amount of image-based content (e.g., photos, graphics, videos, games, etc.) on a social network for which detection is less accurate and more processor-intensive.

This document discloses various improved techniques, methods, and systems for detecting content that pertains to a particular subject of interest based upon links among users of a social network. The various disclosed techniques, methods, and systems can utilize links between users of a social network to detect profile pages that likely contain content of interest. A link among users of a social network can be any sort of connection between two or more users of a social network, such as an explicit acquaintance relationship (e.g., designation as friends, colleagues, fans, blog feed followers, etc.), an implicit acquaintance relationship (e.g., friends in common, messages sent between users, viewing another user's profile page, etc.), a common group membership (e.g., membership in a group related to a particular interest, membership in a group related to a particular geographic area, etc.), participation in a common activity (e.g., users posting messages to the same forum, users playing an online game together, etc.), etc.

Users that share a link may be likely to have common interests and may be likely to post content to their profile pages related to similar topics. Links for a user with a profile page containing content known to pertain to a particular subject of interest can indicate that the profile pages of other linked-to users are likely to also contain content that pertains to the particular subject of interest. Links among users of a social network can be used to propagate classifications (e.g., advertisement-related content, illegal content, inappropriate content for minors, etc.) for content that has already been identified as pertaining to a particular subject of interest to other content for which a classification is unknown.

For instance, a first user and a second user that are designated as friends on a social network may be friends based upon a set of common interests (e.g., the first user and the second user are both interested in tennis). If the first user adds content to its profile page that is related to sports, then the friendship (link) between the first user and the second user can indicate that the profile page of the second user is likely to contain content related to sports as well. A sports classification can be propagated from the first user to the profile page of the second user based upon the friendship link between the two users.

FIG. 1A is a conceptual diagram of an example system 100 for detecting content on a social network using links among users of the social network. The depicted example system 100 includes a content detection server 102 that identifies pages (e.g., user profile page, social group page, forum, etc.) of the social network that are likely to contain content associated with a particular subject (e.g., content related to an advertisement, adult content, etc.) of interest based upon user links (e.g., explicit acquaintance relationship, implicit acquaintance relationships, etc.) on a social network. The social network for which the content detection server 102 identifies content can be hosted by social network servers 104.

The social network servers 104 can host any variety of social networks. For example, the social network servers 104 can host a friendship-oriented social network (e.g., FACEBOOK, MYSPACE, ORKUT, etc.), a business-oriented social network (e.g., LINKEDIN, etc.), a blog-oriented social network (e.g., TWITTER, etc.), etc. The social network servers 104 store an array of information regarding content posted to and activity on the social network, including links (e.g., friendship, fan, blog feed follower, friends in common, etc.) established between users. As described above, links between users can be established explicitly (e.g., friendship) and implicitly (e.g., common group membership) between users. The social network servers 104 are informed of established explicit relationships between users (e.g., the social network servers 104 are notified when a user accepts another user's friend request). The social network servers 104 can additionally determine implicit links between users based upon a variety of information, such as existing links between users and user activity on the social network (e.g., page views, forum posts, social group participation, etc.).

Links between users of the social network can be assembled into a graph of the social network 106. In the example graph 106 that is depicted, the nodes labeled U1-U7 represent users of the social network. The nodes for users U1-U7 are connected by links. In this example, the links indicate that a user of the social network has a relationship (explicit or implicit) with another user of the social network. For instance, user U2 has a relationship with users U1, U4, and U7, as indicated by the links that connect the node for user U2 to the nodes for users U1, U4, and U7.

The social network servers 104 provide social network links 108 for users of the social network to the content detection server 102. As described above, the content detections server 102 uses the links 108 to detect content on the social network of users.

Additionally, the content detection server 102 receives information 112 regarding profiles that have been positively identified as containing content associated with a particular subject of interest from an identified profile repository 110. The content detection server 102 uses the received information 112 in conjunction with the links 108 to detect content on the social network. The received information 112 can be specific to a particular subject of interest (whereas the links 108 can be generic). For instance, if the content detection server 102 is attempting to identify profile pages that likely contain content associated with downhill skiing, the identified profile repository 110 can provide pages of the social network already identified as containing content related to downhill skiing. The identified profile repository 110 can include information regarding associations between users of the social network and one or more of a variety of subjects of interest, such as music, sports, adult content, content in contravention of a EULA, etc. In the depicted example, the information 112 indicates that the profile page associated with the user U2 has been identified having content associated with the particular subject of interest.

The identified profile repository 110 can be populated with identified profiles in a variety of ways. For example, profiles can be identified and added to the repository 110 based upon manual review of profile pages (e.g., profile manually reviewed by social network administrator in response to being flagged by other users), based upon a user adding content that is known/verified to pertain to a particular subject (e.g., user selects "share on social network" link/button on a news website regarding a news article verified by the news website as pertaining to a particular subject), based upon the profile having previously been identified by the content detection server 102, etc.

For instance, assume user U2 for the social network visits a website "www.classicalmusic.org" and selects a link/button to share a promotional video for an upcoming concert on the social network. The "www.classicalmusic.org" website can provide verification that the promotional video that is being shared on user U2's profile page does in fact pertain to classical music. For instance, meta-data (e.g., tags) associated with the promotional video can be analyzed to verify content associated with the video. In another example, labels can be provided by the classicalmusic.org website that can be used to verify content when seeding nodes of a social graph (as described below in further detail). Based upon such verification, the user U2 can be positively identified as having content associated with classical music and can be added to the identified profile repository 110 with such an association.

To detect content on the social network, the content detection server 102 can construct a graph, similar to the graph 106, using the received links 108. The constructed graph can be used to identify relationships that may exist between users of the social network as indicated by links between users. For example, referring to the graph 106, the users U2 and U4 may have similar content on their profile pages based upon the link that connects the nodes for the two users.

Using the received information 112 that identifies user U2 has having a profile page that contains content associated with a subject of interest, the content detection server 102 can seed the node associated with the user U2 with a score (114). The score can indicate that the profile page of the user U2 contains content associated with the subject of interest. As depicted in social graph 116, the node for user U2 is seeded with a score (as represented by the shading of U2).

The content detection server 102 can propagate the seeded score to other users of the social network using the links as depicted in the graph 116 (118). Scores can be propagated to other users of the social network in a variety of ways, as described in more detail below. Generally, a the propagated score for a user that shares direct links with users that have been identified as having profile pages containing content associated with the particular subject of interest will likely be greater than a propagated score for a user that does not share any direct links with any identified users. For instance, a score propagated from user U2 to user U4 will likely be greater than a score propagated from user U2 to U6 based upon the direct link between users U2 and U4 and the indirect link between users U2 and U6.

As depicted in the example graph 120, the nodes for users U1 and U4 are shaded in addition to the node for user U2. The shading for users U1 and U4 indicates that a high score (in relation to the other nodes in the graph 120) was propagated from the node U2. The high score was propagated to users U1 and U4 based upon user U1 and U4 sharing a direct link with the identified user U2. Although the user U7 shares a direct link with the identified user U2 as well, a high score is not propagated to the user U7. In this simplified example, user U7 does not receive a propagated high score based upon only a third of the links for U7 being to an identified node (the node for user U2), whereas at least half of the links for users U1 and U4 are to an identified node (U2). The user U7 may be linked to user U2 for reasons unrelated to the particular subject of interest, as evidenced by the majority of its links being to user that are not identified as having a profile page with content associated with the subject of interest.

Based upon the propagated scores, the profiles for users U1 and U4 can be identified as likely containing content associated with the particular subject (122). The content detection server 102 can determine whether a propagated score indicates a likelihood of a profile page containing content associated with the particular subject of interest using a variety of techniques, such as a propagated score threshold (e.g., scores greater than the threshold indicate the associated profile page is likely to contain the content of interest), selecting the nodes with the top N scores (e.g., top 2 nodes, top 1% of nodes, etc.), etc.

The content detection server 102 provides the identified profiles U1 and U4 as output (124). The identified profiles U1 and U4 can be provided to a client that requested content detection on the social network. For example, the social network servers 104 can request content be detected by the content detection server 102 for a variety of reasons (e.g., identify content in contravention of the EULA, etc.) and can be provided with information identifying users U1 and U4. Depending on the circumstances surrounding the request from the social network servers 104, a variety of actions can be taken with regard to users U1 and U4 (e.g., target for advertising, lock or restrict access to profile pages, etc.).

In another example, an advertiser's request to target ads at users having content related to a particular topic can be routed to the content detection server 102. Such a request may come a variety of sources, such as directly from the advertiser (not depicted), through another server (not depicted) that provides opportunities to advertise to users of the social network, etc. The information regarding the identified users U1 and U4 can be used to target those users with advertising on behalf of the advertiser.

Figure 1B:
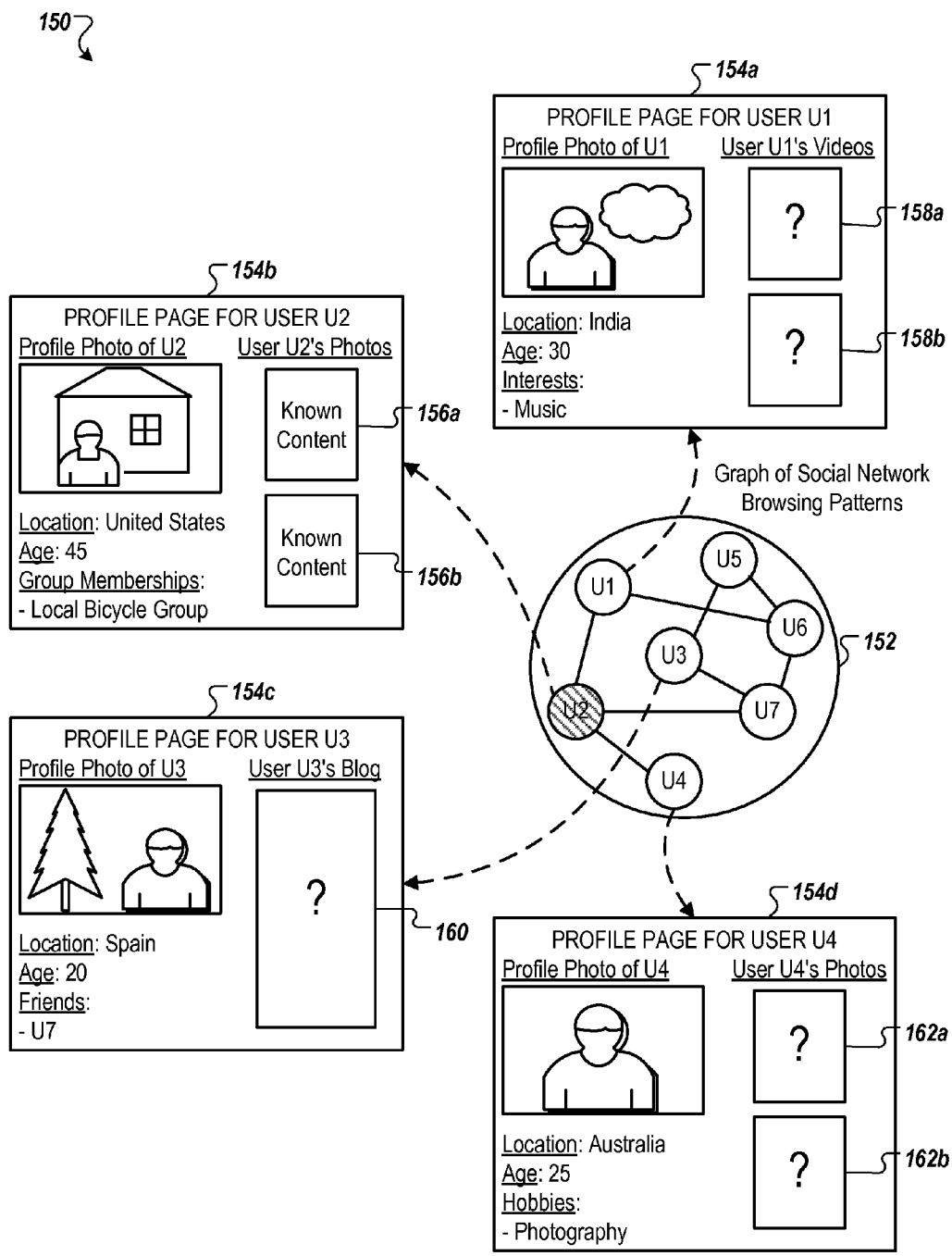
FIG. 1B is a conceptual diagram of profile pages represented by nodes of an example graph of social network links.

FIG. 1B is a conceptual diagram 150 of profile pages 154a-d represented by nodes of an example graph 152 of social network links. The graph 152 and the profile pages 154a-d illustratively demonstrate that subjects associated with content (e.g., text, photos, videos, etc.) on the profile pages 154a-d are generally unknown (or unverified) to a content detection server (e.g., the content detection server 102). Using any of the various techniques described above and below, a content detection server can illuminate the subject matter for at least some of the unknown content contained on profile pages 154a-d. The example graph 152 is similar to the graphs 106, 116, and 120, as described above with regard to FIG. 1A. The graph 152 can be derived from links between users on a social network and can be used by a content detection server (e.g., the content detection server 102) to detect content on the social network.

As described above, profile pages for users of a social network can vary greatly depending on the social network (e.g., friendship network, business networking, etc.) and the type of content users are permitted to post. The profile pages 154a-d are presented as simplified examples of profile pages. Each of the profile pages 154a-d corresponds to one of the users U1-U4. As demonstrated by the varied fields of the profile pages 154a-d (e.g., page 154a presents videos and page 154b presents photos), the type of content presented on a profile page can vary depending on user configuration of the profile page.

Similar to the graphs presented above with regard to FIG. 1A, the graph 152 provides links between the nodes that indicate a relationship (explicit or implicit) between two or more of the users. For example, as indicated in the "Friends" section on the profile page for the user U3, a link between the user U3 and U7 is a friendship link.

Extending the example from FIG. 1A regarding user U2 being identified as having content a profile page 154b with content associated with a particular subject of interest, the photos 156a-b are indicated as being "known content"— meaning the photos 156a-b are known to positively pertain to the particular subject. However, the question marks ("?") provided in content 158-162 for profile pages 154a and 154c-d indicate that a subject associated with the content 158-162 is unknown (e.g., no tag associated with the content) or unverified (e.g., the validity of a tag associated with the content has not been confirmed by a reputable source). For instance, a subject associated with the videos 158a-b posted on the user U1's profile page 154a are unknown, a subject associated with the blog 160 (which may contain a variety of content such as text, hyperlinks to other content, photos, videos, games, etc.) posted on the user U3's profile page 154c is unknown, and a subject associated with the photos 162a-b posted on the user U4's profile page 154d is unknown.

A content detection server, such as the content detection server 102 described above, can resolve at least some of the uncertainty associated with the subject associated with the content 158-162 by performing the content detection techniques described above and below with regard to the graph 152. For example, as demonstrated above with regard to FIG. 1A, the links between users can indicate that the profile page 154d for user U4 is likely to contain content (e.g., the photos 162a-b) associated with the particular subject of interest.

Figure 2:
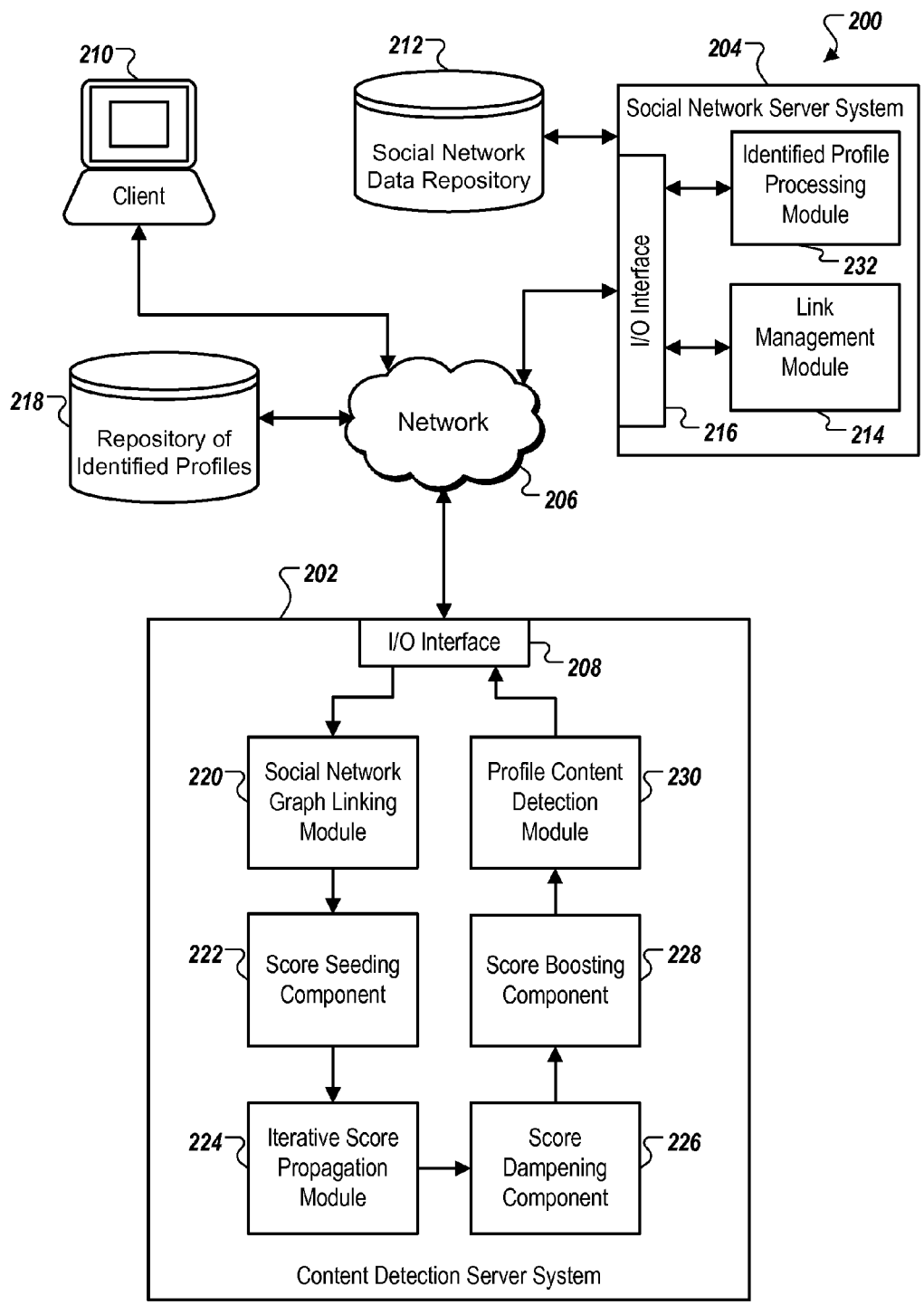
FIG. 2 is a diagram of an example system for detecting content on a social network based upon links between users of the social network.

FIG. 2 is a diagram of an example system 200 for detecting content on a social network based upon links between users of the social network. The system 200 is similar to the system 100 discussed above with regard to FIG. 1A. The system 200 includes a content detection server system 202 that detects content on a social network based upon links between users and pages of the social network positively identified as containing content associated with a subject at issue. The content detection server system 202 can be any of a variety of server systems, such as a dedicated server system, a distributed server system, a collocated server system, etc.

To detect content on a social network, the content detection system 202 interacts with a social network server system 204 over a network 206 (e.g. a LAN, a WAN, the Internet, an intranet, a wireless connection, a communicative coupling, etc.). Similar to the social network servers 104 described above with regard to FIG. 1A, the social network server system 204 can host the social network for which the content detection server system 202 is attempting to detect content.

The content detection server system 202 receives a request to locate content on the social network hosted by the social network server system 204 at an input/output (I/O) interface 208. The request can specify a particular subject of interest (e.g., advertising-related content, adult content, etc.) to be located on the social network. The I/O interface 208 can be any variety of interface capable of communicating with other computing devices over the network 206, such as a wireless network card, an Ethernet card, a telephone modem, etc. The content detection server system 202 can receive the request from a variety of sources, such as the social network server system 204, a client computer 210, etc. The client computer 210 (e.g., laptop, desktop computer, cell phone, PDA, etc.) can be various entities, such as an advertiser, an advertising server system, a backend computing system for the social network server system, an owner of intellectual property (e.g., copyright holder), a government agency (e.g., law enforcement attempting to locate illegal activity on the social network, etc.), etc.

To process the request, the content detection server system 202 obtains links between users of the social network from the social network server system 204. Among a variety of other data regarding the social network hosted by the social network server system 204, the links between users can be stored in a social network data repository 212 (e.g., database, file system, etc.). A link management module 214 that is part of the social network server system 204 can retrieve the links between users from the social network data repository 212 and provide them to the content detection server system 202 through the network 206 using an I/O interface 216. The I/O interface 216 can be similar to the I/O interface 208.

The content detection server system 202 can additionally receive information regarding profile pages (or other pages) of the social network that are positively identified as pertaining to the subject of the request. Such information can be retrieved from a repository of identified profiles 218 (e.g., database, file system, etc.) over the network 206. In some implementations, the repository of identified profiles 218 is part of or connected to the social network server system 204. In some implementations, the repository of identified profiles 218 is part of or connected to the content detection server system 202. In other implementations, the repository of identified profiles 218 is accessible over the network 206 as part of a freestanding system (e.g., a database server system, a file server system, etc.).

Using a social network graph linking module 220, the content detection server system 202 constructs a graph from the received links between users of the social network. The graph can include nodes that correspond to users of the social network and links that connect the nodes, similar to the graphs described above with regard to FIGS. 1A-B. A score seeding component 222 can seed nodes that have been positively identified as pertaining with requested subject (as indicated by the information received from the repository of identified profiles 218) with a score that indicates such an identification (e.g., step 114 described above with regard to FIG. 1A).

An iterative score propagation module 224 can propagate the seeded scores to other nodes of the created social graph based upon the links between users of the social network (e.g., step 118 described above with regard to FIG. 1A). A variety of propagation techniques can be used by the iterative score propagation module 224. In one example technique, the iterative score propagation module 224 propagates scores from the seeded nodes (the nodes identified as pertaining to the particular subject of interest) along each of the links for the seeded nodes to other nodes. A score that is propagated to a node can be based upon the number of neighbors for the node (e.g., the number of other nodes connected to the node by links in the social graph). For example, a score propagated to a node can be the sum of the scores for each of the neighbor nodes divided by the number of neighbor nodes. Referring to the social graph 116 described above with regard to FIG. 1A, if a score for the node U2 is seeded as 100, using the described example technique, a score propagated from U2 to U1 is 500 (500=100 (sum of scores for neighbor nodes)/2 (number of neighbor nodes for U1 (U2 and U6))).

Scores can iteratively be propagated across the links of the social graph. For example, the score for node U1 can then be propagated to the nodes that are connected to it by links of the social graph—the score for U1 can be propagated to the node U6 (and in some implementations to U2). Iterative propagation of scores throughout the social graph can continue until a sufficient number of iterations have been reached for the social graph (e.g., 1 iteration, 2 iterations, 4 iterations, 7 iterations, etc.). The sufficient number of iterations can be based upon a variety of factors, such as the size of the social graph, whether the scores have reached a level of near-stasis (e.g., the scores for nodes are changing by a negligible amount with each successive iteration), characteristics of social network (e.g., friendship-oriented social network where links generally represent a more significant relationship among users (e.g., friendship), a business-networking social network where links represent less significant relationships among users (e.g., acquaintance relationship)), etc.

A score dampening component 226 can be used to adjust scores for nodes based upon the proximity of nodes (to which a score was propagated) to the seeded nodes. Nodes that are further away from a seeding node in the social network graph can have their scores dampened (decreased) by a greater amount than nodes that are closer to the seeding node. For instance, a first node that did not receive a score until the third iteration of score propagation can have its score dampened by a greater amount than a second node that received a score in the first iteration. Nodes that are further away from a seeding node can be less likely to have content related to the subject of interest (e.g., subject received with the request) than nodes that are closer to the seeding node.

One example technique that can be used by the score dampening component 226 includes multiplying the propagated score by a dampening value (e.g., a number between 0.0 and 1.0, inclusive) that is inversely related to the number of iterations (also referred to as node depth) at which a score was propagated to a node. For example, a first node that has a depth of one (score propagated to the first node in the first iteration) can be dampened using a greater dampening value than a second node that has a depth of three (score propagated to the second node in the third iteration)—meaning the score for the first node will be dampened (decreased) less than the score for the second node.

The dampening value can be computed in a variety of manners. For example, the dampening value can be a dampening factor to the power of the depth for a node (dampening value=dampening factor ^ node depth). As described above, the depth for a node is the iteration at which a score is first propagated to the node. The dampening factor can be a value that is less than 1.0 (e.g., 0.95, 0.9, 0.8, 0.75, 0.6, 0.5, etc.). The dampening factor can vary for a social network depending on a variety of factors, such as the type of social network, the type links between users in the social graph (e.g., explicit acquaintance relationships, implicit acquaintance relationships, etc.), a likelihood that users of the social network that are not directly connected with by a link indicate something about each other (e.g., a likelihood of content pertaining to the particular subject of interest being present on a distant user's profile page), etc.

A score boosting component 228 can be used to boost (increase) a score for a node based upon the number of links between the node and other nodes. For two nodes that have the same score, the node that has a greater number of links can have its score be boosted by a greater amount. A node for a user with a greater number of links can be more likely to have content associated with the particular subject of interest on the user's profile page than a node for a user with fewer links.

A variety of techniques for boosting can be used. The boosting technique used for a social network can depend upon a variety of factors, such as the number of users on the social network, the propensity/ease with which users establish links to one another, the type of links that users establish with one another on the social network (e.g., explicit friendship relationships versus implicit acquaintance relationships), the number of links among users on the social network, the particular subject of interest, the type of social network (e.g., friendship-oriented, blog-oriented, etc.).

One example boosting technique employs a function that uses a logarithmic relationship between the number of links for a node and the amount by which a score is boosted. By using a function with a logarithmic relationship, the function is able to account for large variations (e.g., variations by a factor of 10, 100, 1000, etc.) in the number of links that may be present for users.

The example function can be: score(node)=score(node)* (((log (number of neighbors)/log(denominator))*(multiplier−1))+1). The "score(node)" can be the score for a node during/after propagation and/or dampening of scores for the node. The "number of neighbors" can be a number of nodes to which the node being boosted is linked. The "denominator" can be a value that represents an enormous number of links for a user on a social network (e.g., 1,000; 10,000; 100,000; 1,000,000; etc.). The denominator can vary from each social network base upon a variety of factors, such as a number of users, a number of links between users, the greatest number of links for a single users, the ease with which links can be established between users, etc.

The "multiplier" can be a fixed number (e.g., 0.1, 0.25, 0.67, 1.10, 1.25, 1.4, 1.9, 2.5, etc.) or a determined value. For instance, the multiplier can be a value determined by the following function: multiplier(node)=numerator/score(node). The numerator can be a value such that nodes with relatively small scores will receive a greater multiplier than nodes that have relatively large scores. For example, if scores range from 0 to 10,000 for nodes, then the numerator may be a value such as: 100; 500; 1,000; 2,000; 2,500; 5,000; 10,000; 20,000; etc. In some implementations, the multiplier can be the minimum value of a fixed number multiplier and a determined value multiplier for each node. For example, using a fixed number multiplier of 0.25, then multiplier(node)=numerator/score(node) is used when the computed multiplier less than 0.25, otherwise the fixed number multiplier is used (e.g., when the computed multiplier is greater than or equal to 0.25).

A content detection module 230 examines propagated scores (that may have been dampened and/or boosted) for nodes of the graph to determine a likelihood that a profile page associated with each of the nodes contains content associated with the particular subject (e.g., step 122 described above with regard to FIG. 1A). The content detection module 230 can identify pages of the social network that are likely to contain content associated with the particular subject of interest based upon a variety of factors, such as a comparison between a score for the page and a threshold score, a comparison between a score for the page and scores for other nodes, etc. A threshold score can be selected for a social network based upon various factors, such as a purpose behind identifying content on the social network (e.g., to provide advertisements to users, to locate users that will be deleted for having posted illicit content, etc.). For instance, a threshold score for advertisements can be lower than a threshold score for detecting illicit behavior.

The content detection module 230 can provide information regarding the identified profile pages to the social network server 204, to the client 210, or any other device may have requested that the content detection server system 202 detect content on the social network. The social network server system 204 can receive and process the identification information with a identified profile processing module 232. Depending on the particular subject of interested requested (e.g., content related to advertising, adult content, content in violation of a EULA, etc.), the identified profile processing module 232 can perform various operations, such as targeting a user for advertising on the social network, restriction and/or deletion of a user's account on the social network, etc.

In some implementations, the social network server system 204 and the content detection server system 202 are part of the same system. In such implementations, the social network graph can be updated by the social network graph linking module 220 with current information (e.g., "real time" data) regarding users and links as they change on the social network. Using the social network graph updated with current information, the system can detect content on the social network in real time by updating the scores for nodes on the social graph as it changes. The system can continuously detect content on the social network with a real time social network graph and updated node scores using the score seeding component 222, the iterative score propagation module 224, the score dampening component 226, the score boosting component 228, and the profile content detection module 230.

Figure 3:
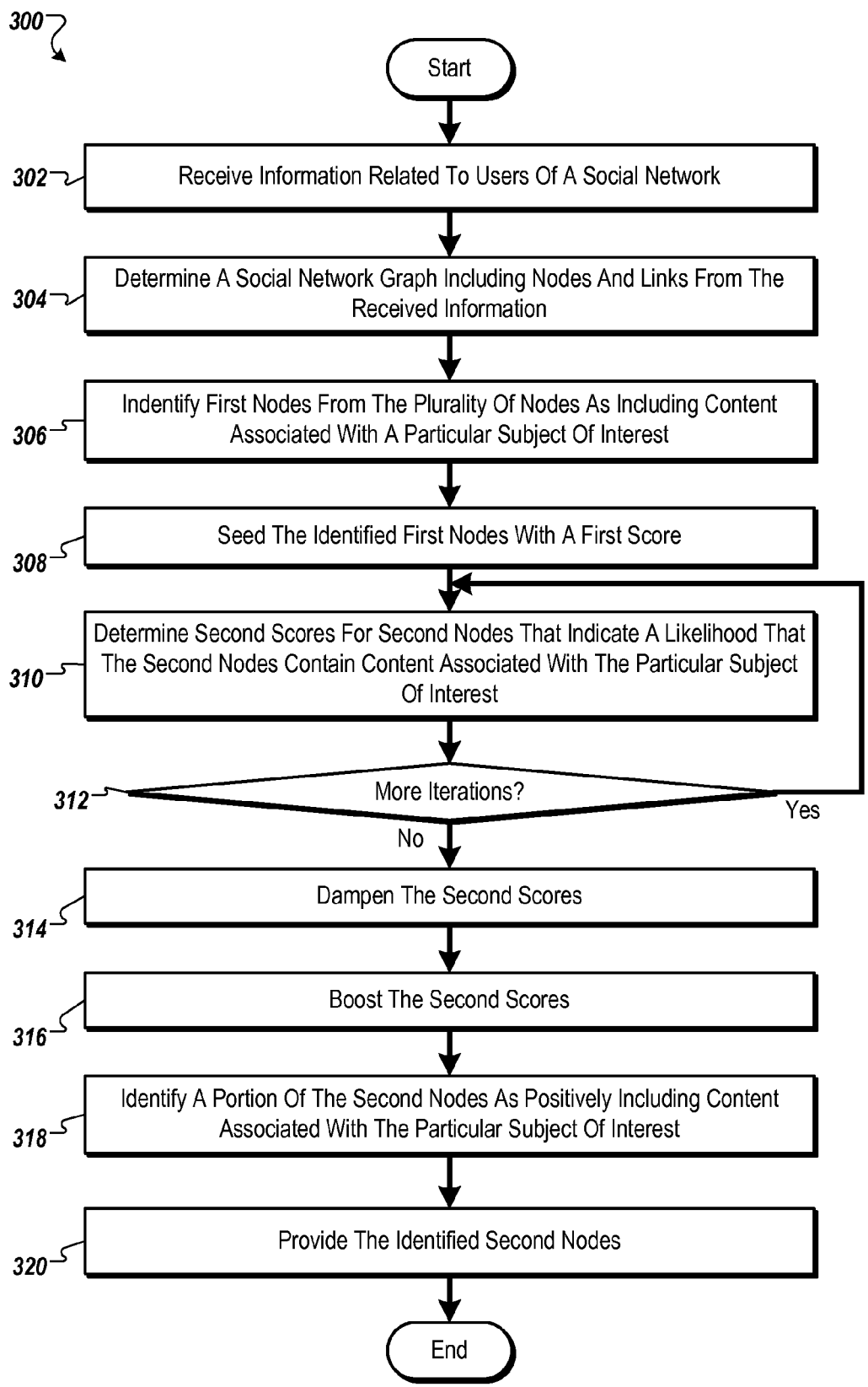
FIG. 3 is a flowchart showing an example technique to detect content on a social network that is related to a particular subject of interest based upon links between users of the social network.

FIG. 3 is a flowchart showing an example technique 300 to detect content on a social network that is related to a particular subject of interest based upon links between users of the social network. The technique 300 is presented from the perspective of a content detection server system, such as the content detection systems 102 and 202. The technique 300 can be performed on a variety of systems, such as the content detection systems 102 and 202, as described above with regard to FIGS. 1A and 2.

The technique 300 begins at step 302 by receiving information related to users of a social network. The received information can include a variety of information, such as links between users of the social network (e.g., explicit acquaintance relationships, implicit acquaintance relationships, common group memberships, etc.), profile pages positively identified as having content associated with a particular subject of interest, etc.

A social network graph that includes nodes and links can be determined from the received information (304). For example, a social graph similar to the social graph 106, as described above with regard to FIG. 1A, can be determined from the received information. In some implementations, the links of the social graph may be weighted according to a variety of factors, such as a type for each link (e.g., explicit acquaintance relationship, implicit acquaintance relationship, etc), a duration of the link (e.g., friendship link established two years ago), a frequency of interaction between the users connected by the link (e.g., a user frequently views status updates that appear from another user designated as a friend on the social network), etc. Weights can be assigned to links when creating the social graph, for example, by the social network graph linking module 220 described above with regard to FIG. 2.

Weighted directional links can be used to further indicate which profile pages of the social graph are likely to contain content associated with the particular subject of interest. For example, if the profile page for user U3 is identified as being associated with adult content (an example particular subject of interest), a link between users U1 and U3 that has a greater weight than a link between users U2 and U3 can provide an indication that a profile page for user U1 is more likely associated with adult content than a profile page for user U2.

First nodes can be identified from the plurality of nodes contained in the social network graph as including content associated with a particular subject of interest (306). The first nodes can be identified in a variety of ways, as described above with reference to FIG. 1A and the described repository of identified profiles 110. The identified first nodes can be seeded with a first score (308). The first score can be a score that is indicative of positive identification. For instance, if scores for nodes range from 0.0 to 1.0 and a score of 0.0 represents a 0% likelihood an associated profile page contains content pertaining to the particular subject of interest and a score of 1.0 may represent a 100% likelihood, then the first nodes can be seeded with a score of 1.0. A variety of score ranges can be used, such as 0-100, −100-100, 0-10,000, etc.

Referring to FIG. 1A as an illustrative example, the social network graph 116 can be determined (step 304) based upon received social network links108 (step 302) for the users U1-U7. The node for user U2 can be identified, based upon information received from the identified profile repository 110 (step 306), and seeded with a score (step 308) indicative of positively identified content.

In some implementations, nodes that are associated with pages that are likely to contain content associated with the particular subject of interest but which have not yet been positively identified can be included in the group of first nodes. For example, nodes that are associated with profile pages that have been computed to have a high likelihood (e.g., greater than 75% chance of containing content associated with the particular subject of interest, etc.) can be included in the group of first nodes. The likelihood a profile page contains content associated with the particular subject of interest can be determined from the described techniques. Such nodes can be seeded with the first score (the same score as positively identified nodes) or a score that is less than the first score (e.g., a score that corresponds to a likelihood that the node contains content associated with the particular subject of interest).

Second scores for second nodes in the determined graph can be determined based upon the scores of the first nodes and the links connecting the second nodes to the first nodes (step 310). The second scores for the second nodes can indicate a likelihood that the second nodes contain content associated with the particular subject of interest. Referring to FIG. 1A again, a likelihood that profile pages associated with the nodes U1 and U3-U7 (the second nodes) can be determined based upon the links of the graph 106 that connect to the node U2 (the first node).

A variety of techniques can be used to propagate scores from a first node to the second nodes. In one example technique, scores are propagated from first nodes to the second nodes based upon a number of other nodes to which each second node is linked. As described above with regard to the iterative score propagation module 224, a second node can receive a score that is a weighted mean of the scores for each node to which the second node is linked. The weighted mean can include scores for the first nodes to which the second node is linked as well as to other nodes (e.g., nodes to which a score has not yet been propagated).

A determination can be made as to whether more iterations of the step 310 should be performed (312). The number of iterations performed can be based upon a variety of factors, such as the size of the social graph, the number of users on the social network, the type of social network, empirical data regarding a sufficient number of iterations, etc. If there are more iterations to perform, then the step 310 is repeated and scores are propagated further across the social graph.

If there are no additional iterations to perform, then the second scores for the second nodes can be dampened (314). Dampening can be performed in a manner similar to the dampening performed by the score dampening component 226, as described above with regard to FIG. 2. A second score for a node can be dampened based upon the number of iterations it took for an owner score to reach the node (e.g., the depth of the node). For example, if an owner score was propagated to user U1 in a first iteration and to user U2 in a third iteration, the score for the user U2 can be dampened (e.g., decreased) by a greater amount than the score for the user U1.

The second scores can also be boosted (316). Boosting can be performed in a manner similar to the boosting performed by the score boosting component 228, as described above with regard to FIG. 2. Score boosting can be used in a variety of instances, such as when a relatively large number of links (in relation to links for other nodes in the social graph) are associated with a node. For example, for a first node and a second node with the same determined scores, if the first node has more links than the second node, the first node can be more likely to have content associated with the particular subject of interest. Score boosting can be based upon a number of links associated with a node. For example, a user that has a profile page containing content associated with a subject of interest may try to gain more attention for the content by establishing links with other users. Boosting can be used to account for such behavior that may indicate the presence of content associated with a particular subject.

A portion of the second nodes can be identified as positively including content associated with the particular subject of interest (318). The second nodes can be identified based upon their owner scores, as determined in the previously described steps. For instance, a second node can be positively identified if the second node has an owner score that exceeds a threshold score. The threshold score can be based upon a variety of factors, such as analysis of empirical data associated with various threshold scores, a purpose behind detecting content on the social network (e.g., advertising, locating illegal activity, etc.), etc.

The identified second nodes can be provided to a variety of entities (320). For example, the positively identified second nodes can be provided to a social network server system (e.g., the social network server system 204), to a repository of identified profiles (e.g., the repository of identified profiles 218), etc. In some implementations, scores for the second nodes are provided in addition/instead of information regarding positive identification. After the step 320, the technique 300 can end.

Figure 4:
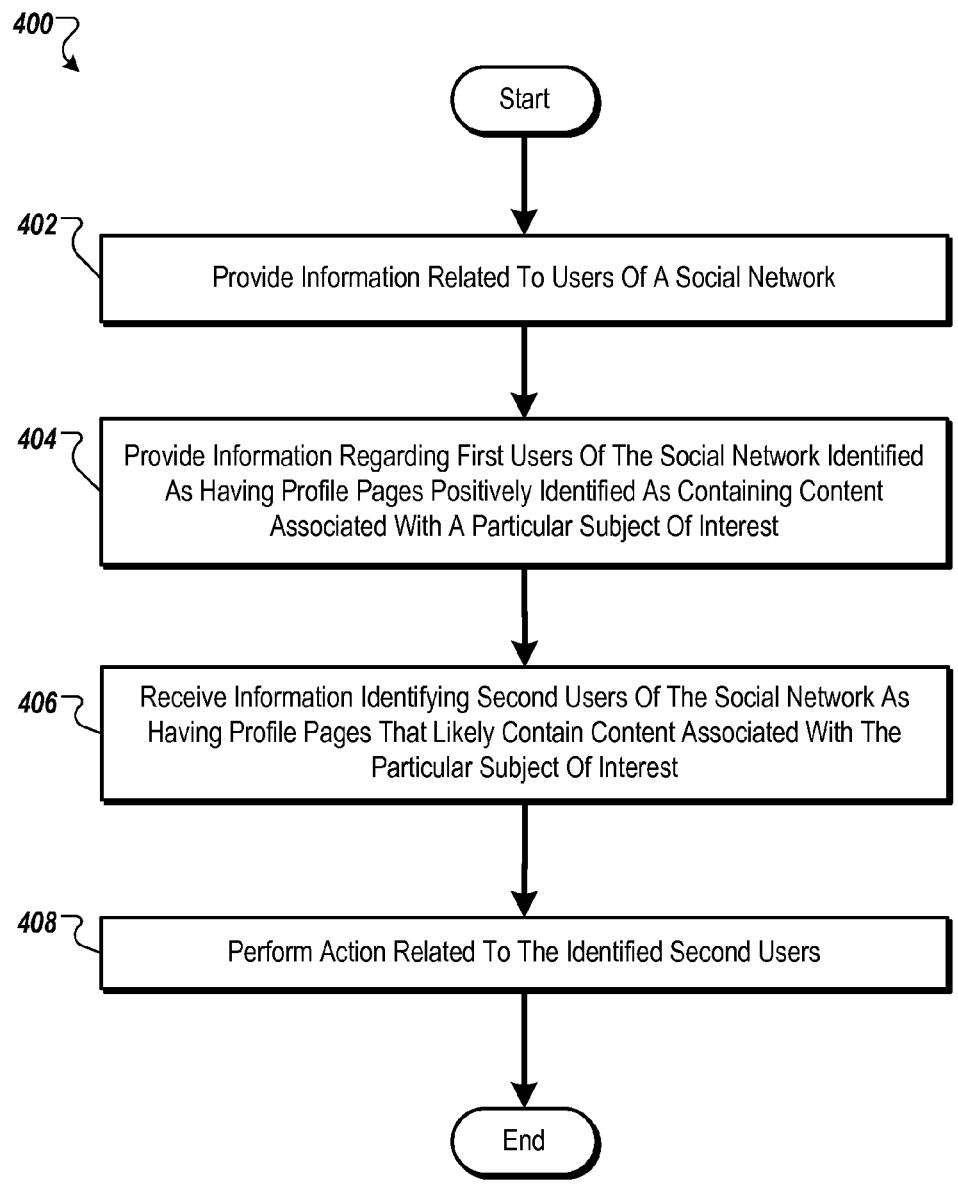
FIG. 4 is a flowchart showing an example technique to detect content on a social network that is related to a particular subject of interest based upon user links.

FIG. 4 is a flowchart showing an example technique 400 to detect content on a social network that is related to a particular subject of interest based upon user links. The technique 400 is presented from the perspective of a social network server system, such as the social network servers 104 and the social network server system 204. The technique 400 can be performed on a variety of systems, such as the social network servers 104 and the social network server system 204, as described above with regard to FIGS. 1A and 2.

The technique 400 can begin at step 402 by providing information related to users of a social network. The provided information can regard links between users of the social network. The information can pertain to some or all of the users of the social network. For instance, information regarding a sub-graph (e.g., a group of users on the social network with many connections to each other and few to users outside of the group) of the social network can be provided. The information can be provided to a content detection server system, such as the content detection server system 202, as described above with regard to FIG. 2. In conjunction with the information relating to users of the social network, a request to identify content pertaining to a particular subject of interest can be provided.

Information regarding first users of the social network that have been identified as having profile pages containing content associated with the particular subject of interest can be provided (404). For instance, the social network server system 204 can provide information regarding identified profile pages using the repository of identified profiles, as described above with regard to FIG. 2.

Information identifying second users of the social network as having profile pages that are likely to contain content associated with the particular subject of interest can be received (406). For instance, the social network server system 204 can receive information identifying the second users as likely having profile pages that contain content associated with the particular subject of interest from the content detection server system 202, as described above with regard to FIG. 2.

An action related to the identified second users can be performed (408). The action can vary depending on the particular subject of interest. For instance, if the particular subject of interest is related to advertising content, then the action may involve displaying an advertisement associated with the particular subject on a profile page of one of the second users. In another example, if the particular subject of interest is adult content that violates a EULA for the social network, the action can involve removing the content from the second users' profile pages, deleting/disabling the second users' profile pages, etc. In some instance, the action can involve submitting the profile pages for the second users to a queue of profile pages for manual content review. After the step 408, the technique 400 ends.

Figure 5:
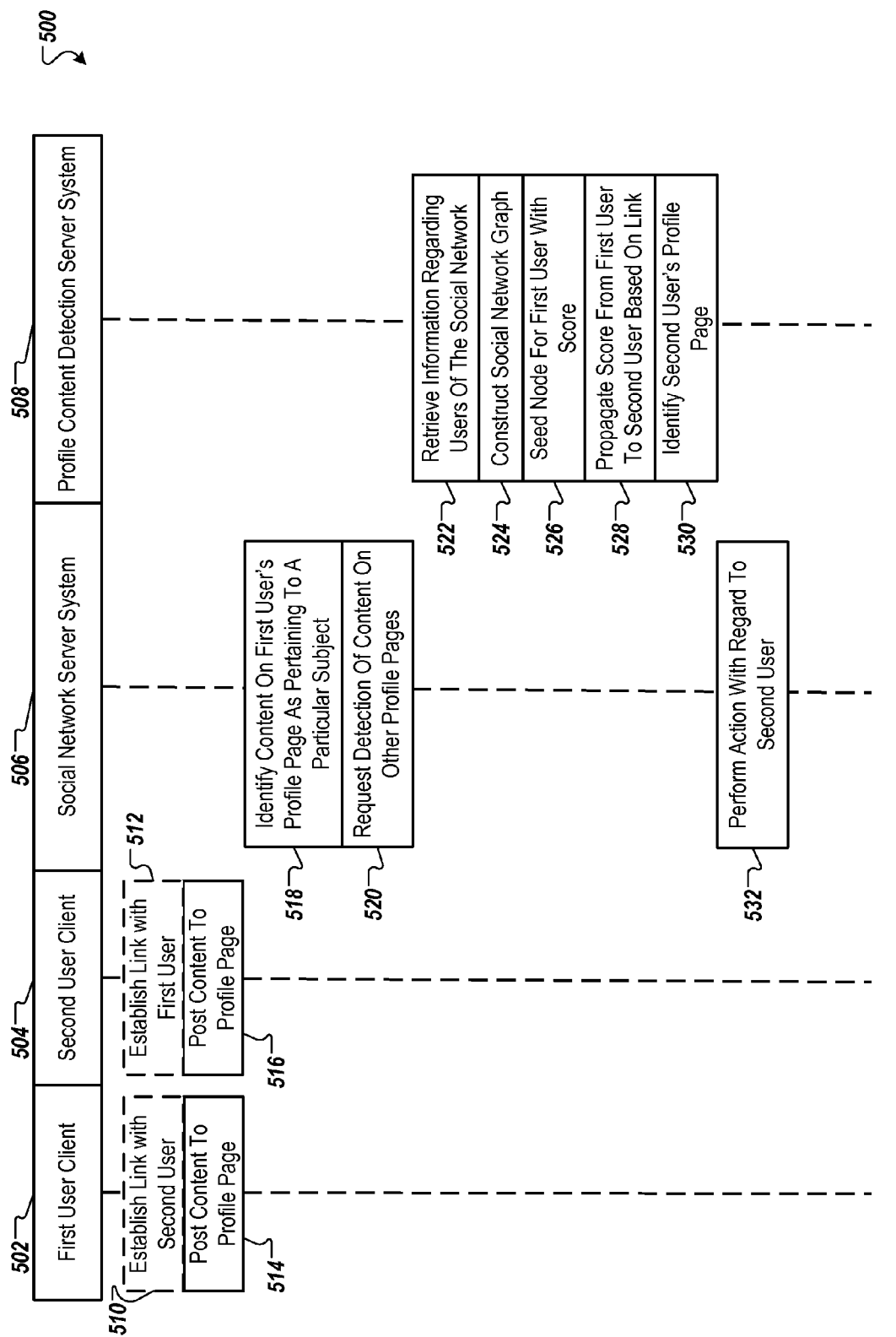
FIG. 5 is a timeline of an example process for detecting content pertaining to a particular subject of interest on a social network.

FIG. 5 is a timeline 500 of an example process for detecting content pertaining to a particular subject of interest on a social network. The example process can be performed by a first user client 502, a second user client 504, a social network server system 506, and a content detection server system 508, which may be similar to and/or correspond to the client computer 210, the social network server system 204, and the content detection server system 202, as described above with regard to FIG. 2. Similarly, the example process depicted on the timeline 500 may be similar to the techniques 300 and/or 400, described above with respect to FIGS. 3 and 4.

At time 510, the first user client 502 (a client for a first user of a social network) may establish a link with the second user. Establishing a link to the second user can include expressly performing an action with regard to the link (e.g., accepting a friend request from the second user, subscribing to the second user's blog feed, etc.) or implicitly performing an action with regard to the link (e.g., becoming a member of a group to which the second user is also a member). In some implementations, the link can be established without any action by the first user client 502. Alternatively, the second user client 504 (a client for the second user of the social network) may establish a link with the first user in a similar fashion (time 512).

At time 514, the first user client 502 posts content (e.g., image, video, text, game, etc.) to a profile page for the first user. The second user client 504 posts content to a profile page for the second user (time 516).

At time 518, the social network server system 506 identifies that content posted to the first user's profile page pertains to the particular subject of interest. For instance, the social network server system 506 can identify the first user's profile page in a variety of ways, as described above with regard to the repository of identified profiles 110. The social network server system 506 can request detection of content pertaining to the particular subject of interest (time 520). The request can be provided from the social network server system 506 to the content detection server system 508.

At time 522, information regarding users of the social network can be retrieved by the content detection server system 508. The retrieved information can include links between users of the social network. The profile content detection server system 508 can construct a social network graph from the retrieved information (time 524). At time 526, the profile content detection server system 508 can seed a node corresponding to the first user with a score that indicates the profile page for the first user was identified as containing content associated with the particular subject of interest. At time 528, the content detection server system 508 can propagate the seeded score from the first user to the second user based upon the established link between the first user and the second user. The content detection server system 508 can identify that the profile page for the second user likely contains content associated with the particular subject of interest based upon the propagated score (time 530).

The content detection server system 508 can provide information regarding identification of the second user to the social network server system 506. At time 532, the social network server system 506 can perform an action with regard to the second user. As described above with regard to technique 400, a variety of action can be performed by the social network server system 506 based upon the particular subject of interest.

Figure 6:
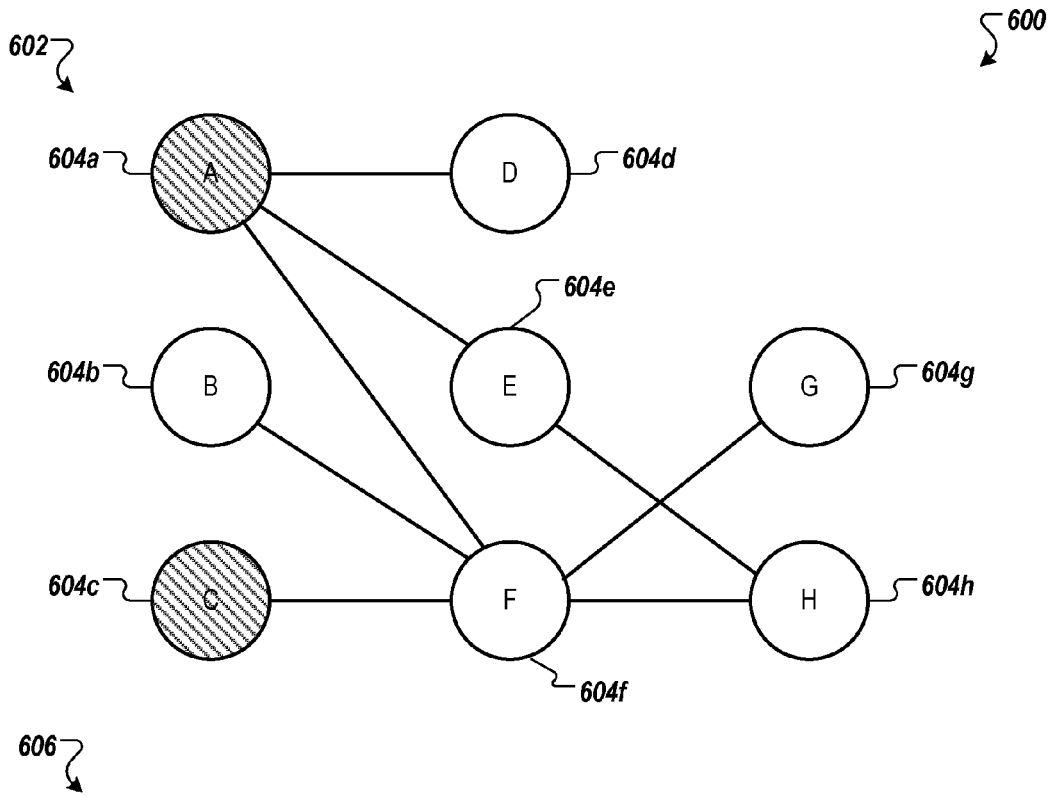
FIG. 6 is a simple example illustration of propagating scores across a social graph for the purpose of identifying profile pages that are likely to contain content associated with a particular subject of interest.

FIG. 6 is a simple example illustration 600 of propagating scores across a social graph for the purpose of identifying profile pages that are likely to contain content associated with a particular subject of interest. The illustration 600 is an example of score propagation using the technique 300, as described above with reference to FIG. 3. The score propagation depicted in the illustration 600 can be performed using a variety of systems, such as systems 100 and 200 described above with regard to FIGS. 1A and 2.

The illustration 600 includes a social graph 602 that is made-up of nodes 604a-h corresponding to users A-H of a social network. The nodes 604a-h are connected by links between the users A-H. As described above, the links can represent a variety of relationships among users of the social network, such as explicit acquaintance relationships (e.g., friendship), implicit acquaintance relationships (e.g., participation in the same forum), common social group memberships, etc. For example, the node for user D 604d is connected to the node for user A 604a by a link that indicates the user D has, at the very least, some tangential connection to the user A. As indicated by the shading for the nodes 604a and 604c, the corresponding users A and C have been identified as having profile pages that contain content associated with a particular subject of interest (e.g., music, sports, news, adult content, content in violation of a EULA, etc.).

A chart 606 depicts propagation of scores for each node on the social graph 602 through four iterations. At a first seeding step, the nodes 604a and 604c for users A and C are seeded with an initial score of 10,000. The seeded scores for nodes 604a and 604c are propagated to the nodes 604d-f at a first iteration based upon each of the nodes 604d-f having a link to either node 604a or node 604c. In the depicted example, the scores for the nodes 604d-f are determined based upon a weighted mean of the scores for each neighboring node (a node connected by a link). For example, the node 604f for user F has neighbor nodes 604a-c (users A-C) and 604g-h (users G-H). The sum of the scores for the neighbor nodes is 20,000

(10,000 for 604a; 0 for 604b; 10,000 for 604c; 0 for 604g; 0 for 604h). Based upon the weighted mean for the scores of the neighbor nodes, the score for 604f at the first iteration is 4,000 (20,000/5=4,000).

As depicted in the chart 606, at the second iteration scores are propagated from the nodes 604e-f (the nodes to which scores were propagated in the first iteration) to the nodes 604b and 604g-h based upon the links to nodes 604e-f. The propagated scores are determined based upon the weighted mean of the scores for neighboring nodes, as described above. For instance, the score propagated to the node 604h is 4,500 ((5,000+4,000)/2=4,500).

At a third iteration, scores are propagated from the nodes 604b and 604g-h to the nodes 604e-f. For instance, the score propagated to 604f is 6,500 ((10,000+4,000+10,000+4,000+4,500)/5=6,500). At a fourth iteration, scores are propagated from the nodes 604e-f to the nodes 604b and 604g-h. For example, the score propagated to 604h is 6,875 ((7,250+6,500)/2=6,875).

As depicted in the chart 606, a depth for each node is provided. For example, a depth for nodes 604d-f for users D-F is one based upon a score being propagated to each of these nodes in the first iteration. A depth for nodes 604b and 604g-h is two based upon a score being propagated to each of these nodes in the second iteration. The depth can be used to dampen each of the scores. As described with regard to the score dampening component 226, the score for each node can be dampened by a factor ^ depth of the node—nodes that have a greater depth are dampened more than nodes that have a smaller depth. Using an example factor of 0.9 for illustrative purposes, the score for the node 604f that has a depth of 1 is dampened from 6,500 to 5,850 (6,500*(0.9^1)=5,850). In contrast, the score for the node 604g that has a depth of 2 is dampened from 6,500 to 5,265 (6,500*(0.9^2)=5,265). A greater score for the node 604f results based upon its proximity to the two seeded nodes 604a and 604c—the node 604f is more likely to have content associated with the particular subject of interest than the node 604h.

As further depicted in the chart 606, the dampened scores are boosted. The example boosting is based upon a number of neighbor nodes for each of the nodes 604b and 604d-h (the scores for nodes 604a and 604c can be excluded from boosting and dampening). A node that has a greater number of neighbors can be boosted by a greater amount (e.g., percentage) than a node having a smaller number of neighbors. A number of neighbors for a node can provide an indication of whether the node will contain content associated with the particular subject of interest. The scores are boosted using the following example function (described in further detail above with regard to the score boosting component 228): score (node)=score(node)*(((log(number of neighbors)/log(100,000))*multiplier)+1). In this example, the multiplier is set to 0.25. As depicted by the boost row, the score for the node 604f for the user F was boosted by the greatest amount—of the nodes 604b and 604d-h, the node 604f has the greatest number of neighbor nodes (five).

Figure 7:
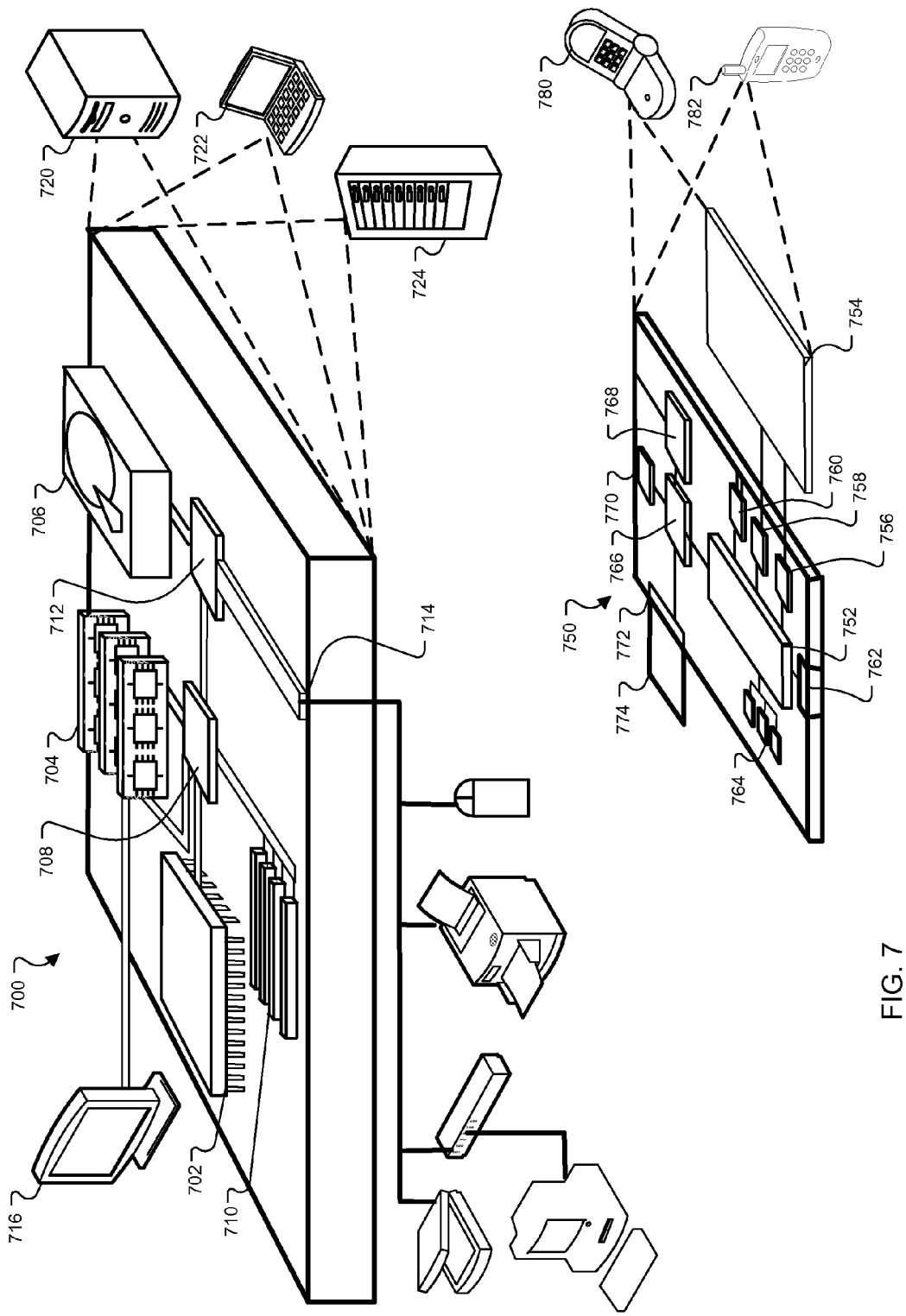
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting content on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving at a first server system information related to users of a social network site hosted on a second server system;
   determining by the first server system a social network graph for at least a portion of the social network from the received information, the graph comprising a plurality of nodes connected by links, each node corresponding to a user that is registered with the social network and that has a profile page on the social network;
   identifying first nodes from the plurality of nodes as including content associated with a particular subject of interest;
   seeding the identified first nodes with first scores that indicate profile pages for the identified first nodes are positively identified as including content associated with the particular subject of interest;
   determining second scores for second nodes of the plurality of nodes based on propagation of the first scores from the first nodes to the second nodes using the links of the social network graph, where:
      each of the determined second scores corresponding to a second node indicates a likelihood that a profile page for the second node contains content associated with the particular subject of interest,
      a particular second score for a particular second node is determined based on a combination of scores for neighboring nodes that are connected to the particular second node by one or more of the links, and
      a particular profile page that is associated with the particular second node is determined to have at least a threshold likelihood of containing content that is associated with the particular subject of interest when at least a portion of the scores for the neighboring nodes exceed a threshold score; and
   providing by the first server system the determined second scores for the second nodes.

2. The method of claim 1, wherein the links connecting nodes of the graph comprise acquaintance relationships between two or more users of the social network site.

3. The method of claim 1, wherein the links connecting nodes of the graph comprise common community memberships for two or more users of the social network site.

4. The method of claim 1, wherein the links connecting nodes of the graph comprise a set of common actions performed on the social network site by two or more users of the social network.

5. The method of claim 1, wherein the links connecting nodes of the graph comprise a common set of acquaintance relationships between two or more users of the social network site.

6. The method of claim 1, further comprising repeatedly determining the second scores for the second nodes based on propagation of the first scores from the first nodes to the second nodes using the links of the social network graph and based on propagation of the second scores from the second nodes to among the second nodes using the links of the social network graph.

7. The method of claim 6, wherein the second scores are determined at least a threshold number of iterations.

8. The method of claim 7, wherein the threshold number of iterations comprises at least four iterations.

9. The method of claim 1, wherein propagation of the first scores from the first nodes to the second nodes using the links of the social network graph comprises, for each of the second nodes, computing an average score for all of the nodes connected to the second node in the social graph by links.

10. The method of claim 1, wherein the first scores are propagated from the first nodes to the second nodes through multiple iterations of determining the second scores for the second nodes; and
   the method further comprises, for each of the second nodes, dampening the second score for the second node based upon an iteration at which a score is first propagated to the second node, wherein a score first propagated to a node at an earlier iteration is dampened less than a score first propagated to a node at a later iteration.

11. The method of claim 1, further comprising, for each of the second nodes, boosting the second score for the second node based upon a number of links connecting to the second node, wherein a score for a node having a greater number of links is boosted by a greater amount than a score for a node having a lesser number of links.

12. The method of claim 1, wherein the particular subject of interest comprises at least one of the group consisting adult content and illegal content.

13. The method of claim 1, further comprising identifying a portion of the second nodes that have a second score of at least a threshold level as positively including content associated with the particular subject of interest.

14. The method of claim 1, further comprising:
receiving updated information related to the users of the social network site; and
revising the social network graph using the updated information; and
updating scores for the plurality of nodes based upon the revised social network graph.

15. A system for detecting profile pages on a social network as including content associated with a particular subject of interest, the system comprising:
one or more servers;
an interface for the one or more servers that is configured to receive information related to users of a social network site hosted on a second server system;
a social graph linking module configured to determine a social network graph for at least a portion of the social network from the information received by the interface, the graph comprising a plurality of nodes connected by links, each node corresponding to a user that is registered with the social network and that has a profile page on the social network;
a score seeding component that identifies first nodes from the plurality of nodes as including content associated with a particular subject of interest and that seeds the identified first nodes with first scores that indicate profile pages for the identified first nodes are positively identified as including content associated with the particular subject of interest;
an iterative score propagation module that is configured to determine second scores for second nodes of the plurality of nodes based on propagation of the first scores from the first nodes to the second nodes using the links of the social network graph, where:
each of the determined second scores corresponding to a second node indicates a likelihood that a profile page for the second node contains content associated with the particular subject of interest,
a particular second score for a particular second node is determined based on a combination of scores for neighboring nodes that are connected to the particular second node by one or more of the links, and
a particular profile page that is associated with the particular second node is determined to have at least a threshold likelihood of containing content that is associated with the particular subject of interest when at least a portion of the scores for the neighboring nodes exceed a threshold score; and
a profile content detection module configured to provide the determined second scores for the second nodes.

16. The system of claim 15, wherein the first scores are propagated from the first nodes to the second nodes through multiple iterations of determining the second scores for the second nodes; and
the system further comprising further comprising a score dampening component that is configured to, for each of the second nodes, dampen the second score for the second node based upon an iteration at which a score is first propagated to the second node, wherein a score first propagated to a node at an earlier iteration is dampened less than a score first propagated to a node at a later iteration.

17. The system of claim 15, further comprising a score boosting component that is configured to, for each of the second nodes, boost the second score for the second node based upon a number of links connecting to the second node, wherein a score for a node having a greater number of links is boosted by a greater amount than a score for a node having a lesser number of links.

18. The system of claim 15, wherein the profile content detection module is further configured to identify a portion of the second nodes that have a second score of at least a threshold level as positively including content associated with the particular subject of interest.

19. A system for detecting profile pages on a social network as including content associated with a particular subject of interest, the system comprising:
one or more servers;
an interface for the one or more servers that is configured to receive information related to users of a social network site hosted on a second server system;
a social graph linking module configured to determine a social network graph for at least a portion of the social network from the information received by the interface, the graph comprising a plurality of nodes connected by links, each node corresponding to a user that is registered with the social network and that has a profile page on the social network;
a score seeding component that identifies first nodes from the plurality of nodes as including content associated with a particular subject of interest and that seeds the identified first nodes with first scores that indicate profile pages for the identified first nodes are positively identified as including content associated with the particular subject of interest;
means for detecting profile pages on a social network as including content associated with a particular subject of interest that is configured to determine second scores for second nodes of the plurality of nodes based on propagation of the first scores from the first nodes to the second nodes using the links of the social network graph, where:
each of the determined second scores corresponding to a second node indicates a likelihood that a profile page for the second node contains content associated with the particular subject of interest,
a particular second score for a particular second node is determined based on a combination of scores for neighboring nodes that are connected to the particular second node by one or more of the links, and
a particular profile page that is associated with the particular second node is determined to have at least a threshold likelihood of containing content that is associated with the particular subject of interest when at least a portion of the scores for the neighboring nodes exceed a threshold score; and
a profile content detection module configured to provide the determined second scores for the second nodes.

20. The system of claim 19, wherein the first scores are propagated from the first nodes to the second nodes through multiple iterations of determining the second scores for the second nodes; and
the system further comprising further comprising a score dampening component that is configured to, for each of the second nodes, dampen the second score for the second node based upon an iteration at which a score is first propagated to the second node, wherein a score first propagated to a node at an earlier iteration is dampened less than a score first propagated to a node at a later iteration.

* * * * *

UNITED STATES PATENT AND TRADEMARK OFFICE
CERTIFICATE OF CORRECTION

| | | |
|---|---|---|
| PATENT NO. | : 8,306,922 B1 | Page 1 of 1 |
| APPLICATION NO. | : 12/571924 | |
| DATED | : November 6, 2012 | |
| INVENTOR(S) | : Kunal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 297 days.

Signed and Sealed this
Twenty-eighth Day of May, 2013

Teresa Stanek Rea
*Acting Director of the United States Patent and Trademark Office*